United States Patent
Rivaud et al.

(10) Patent No.: US 10,674,241 B2
(45) Date of Patent: Jun. 2, 2020

(54) MULTIPATH SELECTION IN AN ETHERNET FABRIC IN A MODULAR NETWORK ELEMENT

(71) Applicant: Ciena Corporation, Hanover, MD (US)

(72) Inventors: Daniel Rivaud, Ottawa (CA); Ian Duncan, Ottawa (CA); Anthony J. Mayenburg, Carp (CA); James Tierney, Carp (CA); Simon J. E. Shearman, Almonte (CA)

(73) Assignee: Ciena Corporation, Hanover, MD (US)

( * ) Notice: Subject to any disclaimer, the term of this patent is extended or adjusted under 35 U.S.C. 154(b) by 131 days.

(21) Appl. No.: 15/959,820

(22) Filed: Apr. 23, 2018

(65) Prior Publication Data

US 2019/0327542 A1   Oct. 24, 2019

(51) Int. Cl.
| | |
|---|---|
| *H04Q 11/04* | (2006.01) |
| *H04L 12/801* | (2013.01) |
| *H04L 12/721* | (2013.01) |
| *H04L 12/40* | (2006.01) |
| *H04L 12/931* | (2013.01) |

(52) U.S. Cl.
CPC ... *H04Q 11/0407* (2013.01); *H04L 12/40013* (2013.01); *H04L 45/38* (2013.01); *H04L 45/66* (2013.01); *H04L 47/12* (2013.01); *H04L 49/351* (2013.01)

(58) Field of Classification Search
CPC ............ H04L 12/64; H04L 2012/5616; H04L 2012/563; H04L 2012/5652; H04L 2012/5658; H04L 2012/5681; H04L 27/2602; H04L 27/2613; H04L 27/2647; H04L 12/40013; H04L 41/0213; H04L 41/12; H04L 43/0864; H04L 45/38;
(Continued)

(56) References Cited

U.S. PATENT DOCUMENTS

| | | |
|---|---|---|
| 7,145,773 B2 | 12/2006 | Shearman et al. |
| 8,155,520 B1 | 4/2012 | West et al. |

(Continued)

OTHER PUBLICATIONS

Nathan Farrington et al., Helios: A Hybrid Electrical/Optical Switch Architecture for Modular Data Centers, University of California, San Diego, SIGCOMM'10, Aug. 30-Sep. 3, 2010, New Delhi, India. Copyright 2010 ACM 978-1-4503-0201-2/10/08, pp. 1-12.

*Primary Examiner* — Natasha W Cosme
(74) *Attorney, Agent, or Firm* — Clements Bernard Walker; Christopher L. Bernard; Lawrence A. Baratta, Jr.

(57) ABSTRACT

Systems and methods of Ethernet path selection in a modular network element including one or more ingress line modules, a plurality of switch modules in a chassis, and one or more egress line modules, wherein the one or more ingress line modules and the one or more egress line modules are located separate from one another and connected to the chassis via cabling. The method includes distributing one or more Ethernet flows from the one or more ingress line modules to the one or more egress line modules via the plurality of switch modules; receiving fabric state information at the one or more ingress line modules from the core chassis out-of-band via the cabling; and, responsive to congestion on a path through the plurality of switch modules, selecting a new path by an ingress line module for an Ethernet flow.

19 Claims, 27 Drawing Sheets

(58) Field of Classification Search
CPC ....... H04L 45/66; H04L 47/12; H04L 49/351; H04L 49/40; H04L 69/28; H04L 7/046
USPC .......................................................... 370/392
See application file for complete search history.

(56) References Cited

U.S. PATENT DOCUMENTS

| | | |
|---|---|---|
| 9,124,383 B1 | 9/2015 | Frankel et al. |
| 9,603,289 B1 | 3/2017 | Shearman et al. |
| 9,768,870 B2 | 9/2017 | Miedema et al. |
| 2005/0074990 A1 | 4/2005 | Shearman et al. |
| 2005/0138238 A1 | 6/2005 | Tierney et al. |
| 2006/0045457 A1 | 3/2006 | Ng et al. |
| 2006/0101159 A1* | 5/2006 | Yeh .......................... H04L 45/00 709/246 |
| 2011/0222241 A1 | 9/2011 | Shearman et al. |
| 2015/0139223 A1 | 5/2015 | Mayenburg et al. |
| 2017/0105060 A1* | 4/2017 | Oltman .............. H04Q 11/0005 |
| 2017/0126589 A1 | 5/2017 | Estabrooks et al. |
| 2018/0081137 A1 | 3/2018 | Rivaud et al. |

* cited by examiner

MULTIPATH SELECTION IN AN ETHERNET FABRIC IN A MODULAR NETWORK ELEMENT

FIELD OF THE DISCLOSURE

The present disclosure generally relates to networking systems and methods. More particularly, the present disclosure relates to a modular network element architecture which combines rack mounted units (i.e., "pizza boxes") and chassis-based systems to provide flexibility, scalability, efficiency, etc., i.e., a hardware platform which can support multiple applications including optical/photonic networking, Time Division Multiplexing (TDM), packet switching, etc.

BACKGROUND OF THE DISCLOSURE

Networks, data centers, cloud infrastructure, etc. are realized ultimately through physical hardware. The physical hardware is used to realize networking, computing, and/or storage functions including optical/photonic networking, Time Division Multiplexing (TDM), packet switching, etc. Conventionally, there are generally two approaches for how physical hardware is deployed—through a chassis and associated modules or through a rack mounted unit. A chassis-based system includes a chassis with multiple slots and a backplane which support different modules, line cards, circuit packs, blades, etc. (for simplicity, these are referred to as modules). The chassis-based system allows deployment flexibility where modules as-needed or required are selectively inserted in the chassis. The chassis includes an electrical (Printed Circuit Board (PCB)) backplane, fixed-size modules, shared power and cooling for all of the modules, a central switch fabric such as through one or more modules, etc. Other advantages of a chassis include power installation once for the chassis, front access only, redundancy, tight coupling of software and hardware, etc.

There are several fundamental challenges, namely 1) PCB backplanes are becoming limited in their ability to support higher Serializing-Deserializer (SERDES) rates at the same Fabric-to-Module distances, 2) the industry business model that led to these types of designs is changing, 3) consumption patterns on life-cycle and depreciation practiced by network operators, that is in turn reinforced by the merchant Application Specific Integrated Circuit (ASIC) supply chain, connote requirements for greater modularity, and the like. That is, the conventional chassis-based approach is centralized with a fixed form-factor which limits flexibility in size, power, and the ability to address different applications. Further, the chassis-based approach requires a lock-in ahead of time, suboptimal faceplate use, fixed slot sizes and power, fixed cooling, fixed slot bandwidth, etc. The chassis-based approach requires a large initial investment.

The rack mounted unit is also referred to as "pizza boxes" and generally include 1-2 (or more) Rack Unit (RU or simply U and which is a standard unit of measurement of 44.5 mm or 1.75") high completely enclosed form factor. The rack mounted unit differs from a chassis in that all of the hardware is already included as the rack mounted unit is deployed. For example, data centers realize network elements such as in a leaf/spine architecture in a completely decentralized and modular form using rack mounted units. Advantages of the rack mounted unit approach include standard interfaces, stackability, low cost, adaptability, low first-in cost and pay as you go, etc. While this provides flexibility, this approach has interconnect complexity, such as massive amounts of cabling in the front and this cabling is based on pluggable optics which lack the density achievable in chassis-based approach. Also, this approach does not include redundancy, expansion to larger systems is complex and inefficient, and each install requires a power connection.

BRIEF SUMMARY OF THE DISCLOSURE

As PCB backplanes of current sizes probably only have two generations of link speed left, there will be a transition to electrical cabled backplanes and then to optical cabled backplanes. Many are viewing the cabled systems as simply a replacement for the PCB backplane that offer better signal integrity. However, cabled backplanes offer an entirely new way of thinking about platform design which is not simply a direct replacement for the PCB backplane.

Accordingly, it would be advantageous to provide a hybrid hardware architecture between the fixed chassis-based approach and the completely decentralized rack mounted unit.

In an embodiment, a modular network element includes one or more lineboxes which are a hybrid between a rack mounted module and a line module which is inserted in a chassis; one or more linebox carriers which are rack mountable and configured to selectively receive the one or more lineboxes and provide power connectors and data connectors thereto; and a core chassis including one or more switch modules, one or more controller modules, and a set of connectors located at the rear for cabling to the power connectors and the data connectors on the one or more linebox carriers. The one or more lineboxes can include a plurality of faceplate ports connected to fabric circuitry communicatively coupled to the one or more switch modules via the cabling; and the one or more switch modules can be connected to one another and the one or more controller modules via a midplane or cables.

The cabling can include one or more of electrical cabling with a plurality of pairs of coaxial cable and optical cabling. Each cable between a linebox and the core chassis can include a plurality of bundles each having a plurality of links and a number of the plurality of bundles is based on a number of the one or more switch modules. A chassis management protocol can be implemented between the one or more lineboxes and the core chassis, and the one or more lineboxes and the core chassis can be managed as a single entity. The chassis management protocol can implement, between the one or more lineboxes and the core chassis, timing synchronization, presence, status, ownership, interrupts, reset, power, and position identification. The one or more controller modules provide power and connectivity to circuitry on each linebox for establishing the chassis management protocol to power the linebox on and off. The core chassis can include an access panel that supports the core chassis and each of the one or more lineboxes. Each of the one or more lineboxes can include a display which provides a virtual slot number based on a relative position in a rack.

The one or more lineboxes can include a plurality of lineboxes with at least two lineboxes having a different pitch. The one or more lineboxes can include a plurality of lineboxes with at least two lineboxes having one or more of a different number of faceplate ports and a different type of pluggable optics. The one or more lineboxes each can include an Ethernet switch which connect to another Ethernet switch in the one or more switch modules. The one or more linebox carriers can include retractable pins with a spring-loaded mechanism that grabs into holes in rails on a rack and which has a push to disengage mechanism enabling front-only access to the rack. The one or more linebox carriers can have slack in the cabling to the core chassis allowing movement up and down the rack.

In another embodiment, a method of deploying a modular network element includes connecting a linebox slot carrier to a rack; providing a linebox in the linebox slot carrier, wherein the linebox is a hybrid between a rack mounted module and a line module which is inserted in a chassis, and wherein the linebox slot carrier connects the linebox to power connectors and data connectors; and providing a core chassis including one or more switch modules, one or more controller modules, and a set of connectors located at the rear with cabling to the power connectors and the data connectors on the linebox slot carrier. The method can further include providing a second linebox to a second linebox slot carrier responsive to increase capacity of the modular network element. The second linebox can be added to the core chassis in-service.

In a further embodiment, a modular network element includes one or more lineboxes which are a hybrid between a rack mounted module and a line module which is inserted in a chassis, each of the one or more lineboxes including a plurality of faceplate ports connected to fabric circuitry and a processor; and one or more linebox carriers which are rack mountable and configured to selectively receive the one or more lineboxes and provide power connectors and data connectors thereto. The one or more lineboxes can include a plurality of lineboxes collectively forming a mesh therebetween via the data connectors, and one of the plurality of lineboxes can be designated as a primary linebox for implementing a virtual controller of the modular network element via the processor. A core chassis can be added in-service to increase capacity of the modular network element, the core chassis can include one or more switch modules, one or more controller modules, and a set of connectors located at the rear for cabling to the power connectors and the data connectors on the one or more linebox carriers.

In an embodiment, a method of Ethernet path selection is performed in a modular network element including one or more ingress line modules, a plurality of switch modules in a chassis, and one or more egress line modules, wherein the one or more ingress line modules and the one or more egress line modules are located separate from the chassis and connected to the chassis via cabling. The method includes distributing one or more Ethernet flows from the one or more ingress line modules to the one or more egress line modules via the plurality of switch modules; receiving fabric state information at the one or more ingress line modules from the chassis out-of-band via the cabling; and, responsive to congestion on a path through the plurality of switch modules, selecting a new path by an ingress line module for an Ethernet flow. The method can further include, prior to switching the Ethernet flow to the new path, creating a gap in the Ethernet flow through buffering such that the gap is no larger than a path delay difference between a current path and the new path. A size of the gap can be set to a latency of the current path minus a latency of the new path plus a margin.

The method can further include distributing a Time Division Multiplexing (TDM) flow by fragmenting the TDM flow and sending over a plurality of paths through the plurality of switch modules. The method can further include distributing timing from the chassis out-of-band via the cabling, wherein the timing is determined at the chassis using a Time Division Multiplexing (TDM) flow which is spread over the plurality of switch modules. The chassis can utilize a TDM packet header to estimate relative path latency differences. The method can further include broadcasting a path selection by each ingress line module to all other line modules and the chassis for each to maintain a global path table. The Ethernet flow can include an elephant flow and each flowburst of the elephant flow is eligible to take a different path if its interburst gap is larger than a difference in latency between a current path and the new path.

In another embodiment, a modular network element configured for Ethernet path selection includes one or more ingress line modules; one or more switch modules in a chassis; and one or more egress line modules, wherein the one or more ingress line modules and the one or more egress line modules are located separate from the chassis and connected to the chassis via cabling, wherein one or more Ethernet flows are distributed from the one or more ingress line modules to the one or more egress line modules via the plurality of switch modules, wherein the one or more ingress line modules receive fabric state information from the chassis out-of-band via the cabling, and wherein, responsive to congestion on a path through the plurality of switch modules, a new path is selected by an ingress line module for an Ethernet flow.

In a further embodiment, a chassis in a modular network element configured for Ethernet path selection includes one or more switch modules; one or more controllers; a midplane for communication between the one or more switch modules and the one or more controllers; and cabling for communication to one or more ingress line modules and one or more egress line modules, wherein the one or more ingress line modules and the one or more egress line modules are located separate from the chassis and connected to the chassis via the cabling, wherein one or more Ethernet flows are distributed from the one or more ingress line modules to the one or more egress line modules via the plurality of switch modules, wherein the one or more ingress line modules receive fabric state information from the one or more controllers out-of-band via the cabling, and wherein, responsive to congestion on a path through the plurality of switch modules, a new path is selected by an ingress line module for an Ethernet flow.

In an embodiment, a modular network element includes a plurality of line modules and zero or more switch modules in a chassis, wherein the plurality of line modules are located separate from the chassis and connected to the chassis and/or to one another via cabling. A method of managing a modular network element as a single entity includes operating a management plane between the plurality of line modules and the zero or more switch modules via one or more dedicated links in the cabling; managing the plurality of line modules and the zero or more switch modules as a single network element utilizing a chassis management protocol over the management plane; and designating one of a controller in the chassis and a processor in one of the plurality of line modules operating as a virtual controller as primary for the chassis management protocol.

The method can further include providing a virtual slot number for each of the plurality of line modules, wherein the virtual slot number is utilized to differentiate the plurality of line modules. The virtual slot number can be automatically assigned based on a position sensor on each of the plurality of line modules or through the chassis detecting a position of each of the plurality of line modules. The management plane can operate over Universal Serial Bus (USB) pins and a 10 Gigabit Ethernet alternate mode which uses a subset of the USB pins. The USB can be used to bridge a plurality of protocols in the management plane and to determine module presence, and wherein the 10 Gigabit Ethernet is utilized for Precision Time Protocol. The USB can be used for power, presence, primary arbitration, bidirectional status, health monitoring, configuration, initialization of data path, software download, interrupts, reset, LED control, I2C bridge, Universal Asynchronous Receiver-Transmitter (UART) bridge, SPI bridge, Pulse Width Modulation (PWM) bridge, General-Purpose Input/Output (GPIO) bridge, and PCIe bridge The method can further include communicating between the controller in the chassis and circuitry on a line module for establishing the chassis management protocol on the line module. The method can further include selecting a candidate clock in the chassis management protocol for synchronization and timing distribution. The method can further include continually measuring delay over the cabling to adjust phase of the timing distribution. The management plane can be operated over the cabling out-of-band from a data plane.

In another embodiment, a modular network element managed as a single entity includes a plurality of line modules; and zero or more switch modules in a chassis, wherein the plurality of line modules are located separate from the chassis and from one another, and connected to the chassis and/or to one another via cabling, wherein a management plane is operated between the plurality of line modules and the zero or more switch modules via one or more dedicated links in the cabling, wherein the plurality of line modules and the zero or more switch modules are managed as a single network element utilizing a chassis management protocol over the management plane, and one of a controller in the chassis and a processor in one of the plurality of line modules operating as a virtual controller is designated as primary for the chassis management protocol.

In a further embodiment, an apparatus configured to manage a modular network element includes a processor and memory storing instructions that, when executed, cause the processor to operate a management plane between the plurality of line modules and the zero or more switch modules via one or more dedicated links in cabling between the plurality of line modules and the zero or more switch modules; and manage the plurality of line modules and the zero or more switch modules as a single network element utilizing a chassis management protocol over the management plane, wherein the apparatus is designated as a primary in the chassis management protocol, and the apparatus is physically separate from at least one of the plurality of line modules and the zero or more switches.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to a modular network element architecture that is a hybrid of the conventional chassis-based approach and the completely decentralized rack mounted unit approach. The modular network element architecture provides the value of integration from the chassis-based approach while offering the flexibility of the decentralized rack mounted unit approach. Variously, network elements can be implemented with the modular network element architecture for packet, hybrid TDM/packet, optical, hybrid TDM/optical, hybrid TDM/packet, hybrid optical/TDM/packet, and the like. Aspects of the modular network element architecture include modularity, stackability, and scalability; a control plane; a flexible faceplate size;

decentralized power/cooling; an open backplane interface; etc. The modular network element architecture is configured for longevity beyond multiple generations of backplane or chipset designs. The modular network element architecture provides the advantages of both the chassis-based approach and the rack mounted unit approach.

The modular network element architecture provides operators the ability to stack and scale. The objective of the modular network element architecture is to provide a single hardware platform that can address various markets, applications, etc. That is, the modular network element architecture can unify disparate platforms thus minimizing development costs and efforts. Having a variable-pitch, variable bandwidth, variable depth, variable power/cooling slot means that the modular network element architecture can offer one platform for many markets. Each market has different needs for module size based on chipsets, faceplate components, etc. For example, a hybrid TDM/packet market requires front-end OTN chipsets that are not required by packet-only markets. Another example, a packet-only market might have higher oversubscription ratios and therefore require more faceplate area for more pluggable optics.

Modular Network Element Architecture

Figure 1:
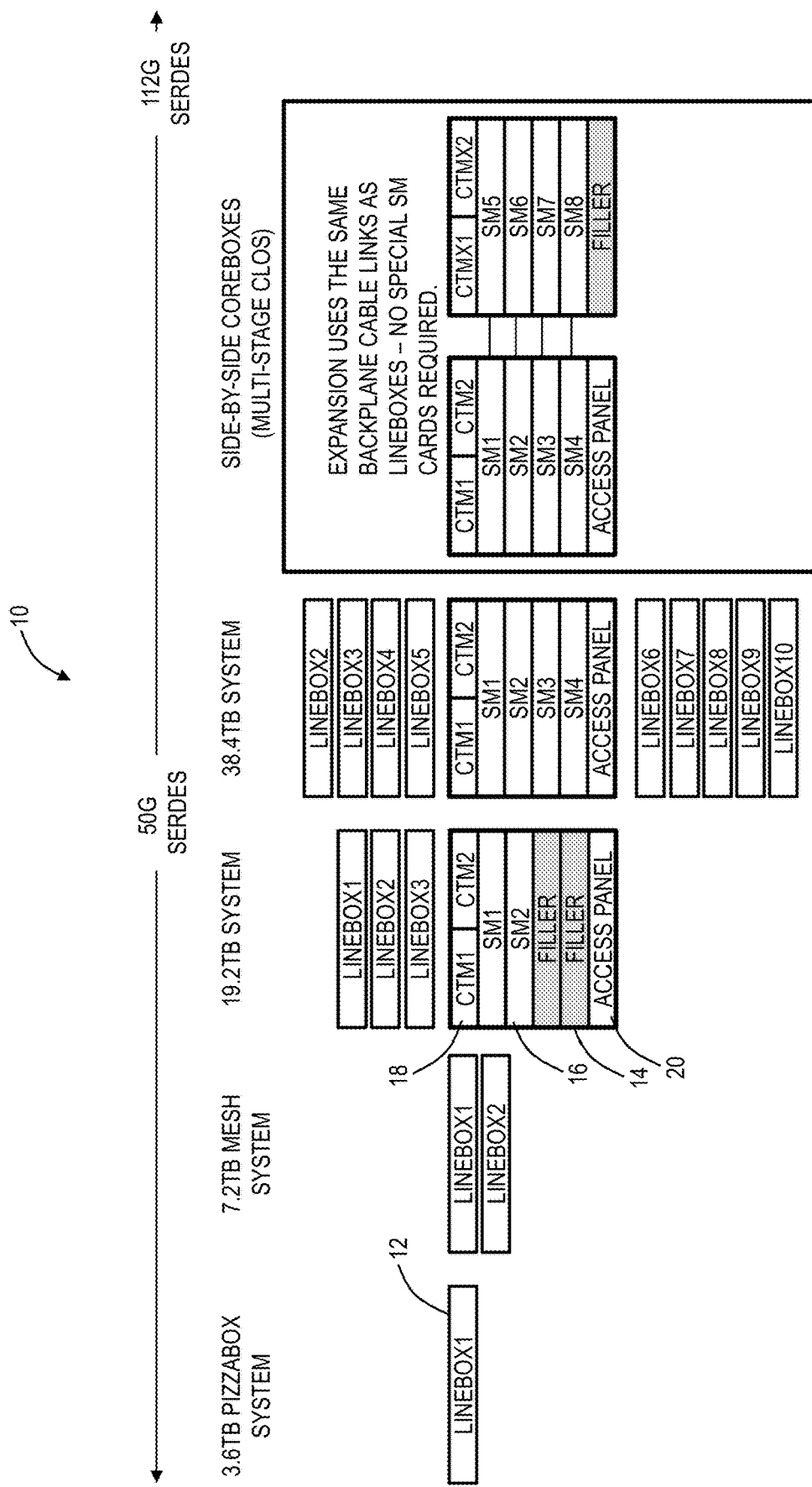
FIG. 1 is a logical diagram of a modular network element architecture utilizing lineboxes and coreboxes to achieve system capacity between 3.6 Tb/s to 80 Tb/s and beyond.

FIG. 1 is a block diagram of a modular network element architecture 10 utilizing lineboxes 12 and coreboxes 14 to achieve system capacity between 3.6 Tb/s to 80 Tb/s and beyond. The modular network element architecture 10 is a hybrid between the chassis-based approach and the rack mounted unit-based approach. Specifically, the modular network element architecture 10 includes one or more lineboxes 12 which are a combination of a rack mounted unit in part and a module in a chassis in part. The lineboxes 12 are called "lineboxes" because of their hybrid nature between line modules and pizza boxes. The lineboxes 12 can be variable sized, are fully enclosed rack mounted modules similar to pizza boxes, but are inserted into slot carriers in a rack which has data connectors (e.g., Twinax) and power connectors. The linebox 12 enables flexibility, a low first-in cost, pay as you grow, a range of system sizes, and are not constrained by slot pitch or slot power (as in a chassis). Additional details are described herein for the linebox 12, but generally the linebox 12 has front access and provides switching at Layer 1 (TDM), Layer 2 (packet), etc. For example, the lineboxes 12 can be 1-2 U high while the corebox 14 can be 6-12 U high. The lineboxes 12 are a hybrid between a pizza box and a line module, e.g., a pizza box which is inserted into a slot carrier which has a connector for data and power. The corebox 14 is similar to a chassis, but only for switch modules (SM) 16 and controller (CTM) modules 18.

At the lower end of capacity, e.g., 3.6 Tb/s to 7.2 Tb/s, the modular network element architecture 10 can employ only one or two lineboxes 12. Advantageously, this avoids the need for a switch module (SM), backplane hardware, cables, power, etc. that is not needed at this capacity. The corebox 14 can be added when required to provide expansion, e.g., at 19.2 Tb/s and above, and to provide an intermediate/center-stage switch for the modular network element architecture 10. After more than one linebox 12 is employed in the modular network element architecture 10, connectivity between the lineboxes 12 and possibly the corebox 14 is through the connectors on the associated slot carriers housing the lineboxes 12. The corebox 14 can support one to four switch modules 16, two controller modules 18, and an access panel 20. The modular network element architecture 10 can support upwards of 40 Tb/s in a single rack, as well as expand to multiple racks through interconnecting coreboxes 14 such as in a multi-stage Clos switch.

Figure 2:
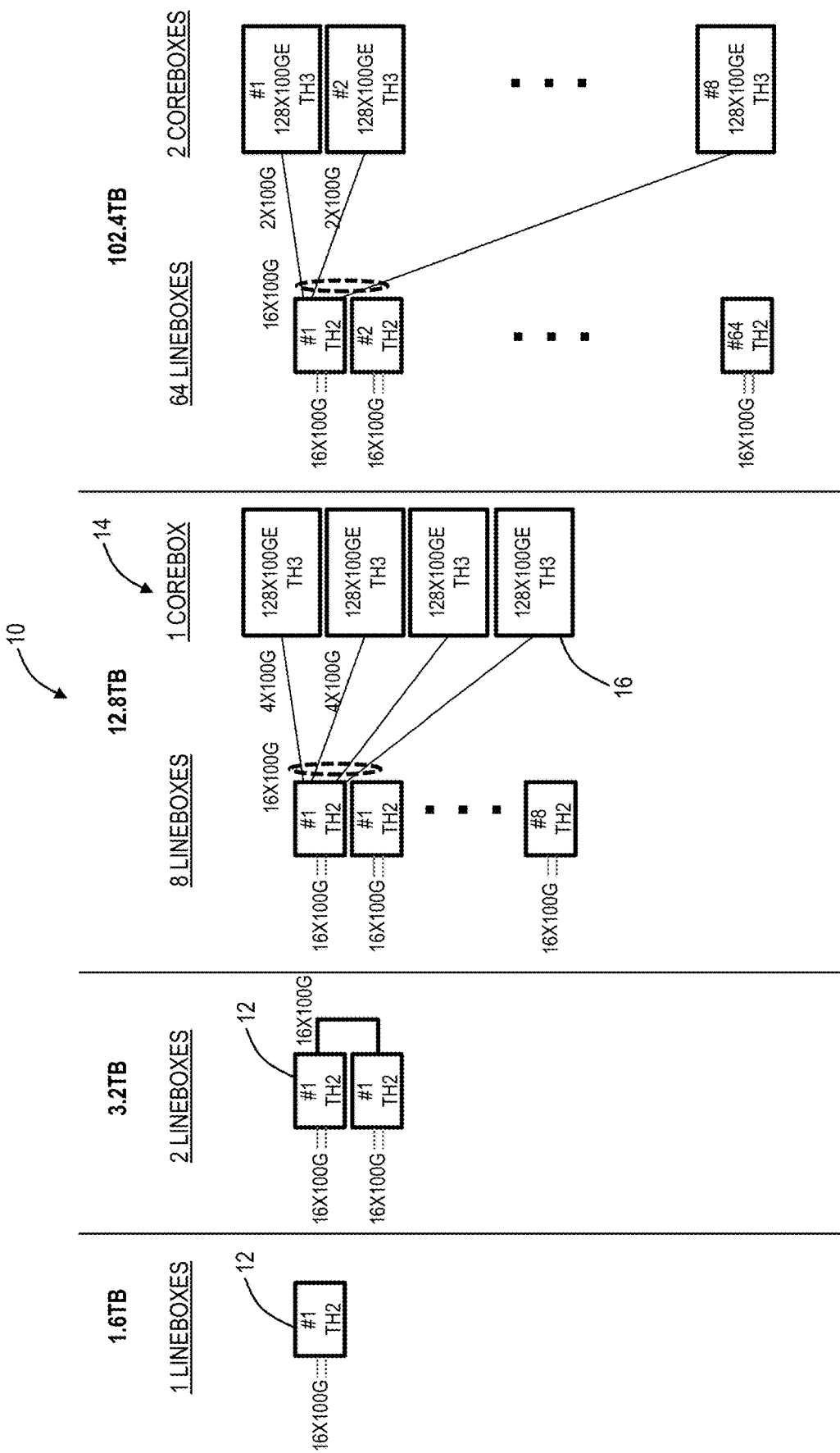
FIG. 2 is a logical diagram of connectivity between the lineboxes and the coreboxes in different configurations of the modular network element architecture of FIG. 1.

FIG. 2 is a logical diagram of connectivity between the lineboxes 12 and the coreboxes 14 in different configurations of the modular network element architecture 10. For illustration purposes, the modular network element architecture 10 is described with reference to packet switching. However, those of ordinary skill in the art will recognize the same hardware, interconnectivity, etc. could be used for TDM (Optical Transport Network (OTN)) switching, Multiprotocol Label Switching (MPLS), Internet Protocol (IP) routing, etc. For example, a single linebox 12 can include 16 front access ports such as at 100 Gb/s each, i.e., 16×100 GbE (Gigabit Ethernet). Two such lineboxes 12 can collectively support 32 front access ports (16×100 GbE×2) as well as 16×100 G ports on the rear through the slot carrier. For example, the corebox 14 can support 128×100 GbE for each switch module 16. With 8 lineboxes 12 and 4 switch modules 16 in one corebox 14 for 12.8 Tb/s, each linebox 12 can connect 4×100 GbE to each switch module 16. With 64 lineboxes 12 and 8 switch modules 16 in two coreboxes 14 for 102.4 Tb/s, each linebox 12 can connect 2×100 GbE to each switch module 16.

Comparison Metrics

Hardware platform can be compared based on metrics such as watts/Gb/s (power), volume/Gb/s (space), and cost/Gb/s (cost). For power, as air cooling is driven to its limits, fan power consumption become a higher part of the total power and more power is required to bend airflow twice versus front-to-back airflow. The modular network element architecture 10 is an open fabric which allows using only a sufficient number of fabric links for each application, requiring less power. Also, Twinax has lower insertion loss than PCB backplanes, thus requiring less power per distance. The modular network element architecture 10 can include an optimized power supply tuned to the specific load of a linebox 12. A system that fully utilizes its chipset is more power efficient than one that underutilizes its chipset. With a fixed-pitch system, the faceplate area is not always matched to the chipset.

If the power supplies are optimized for delivering only the power necessary in the hardware that is present, the space and volume is less. The modular network element architecture 10 can be re-targeted to work in a shallow or deep chassis and is thus more volume efficient. For the cost, including high-rate optical modems into a fixed-pitch design requires heat pipe cooling, the cost of backplanes is increasing, the up-front cost of developing proprietary dedicated hardware is significant, etc. which lead to high costs with conventional approaches. These costs are all avoided in the modular network element architecture 10. The modular network element architecture 10 also avoids the need for a significant number of pluggable optical transceivers which are space inefficient. Further, the modular network element architecture 10 enables variable pitch enabling support for multiple markets/applications with one platform. That is, the modular network element architecture 10 is meant to address various markets/applications enabling a vendor efficiency.

Connectivity

Figure 3:
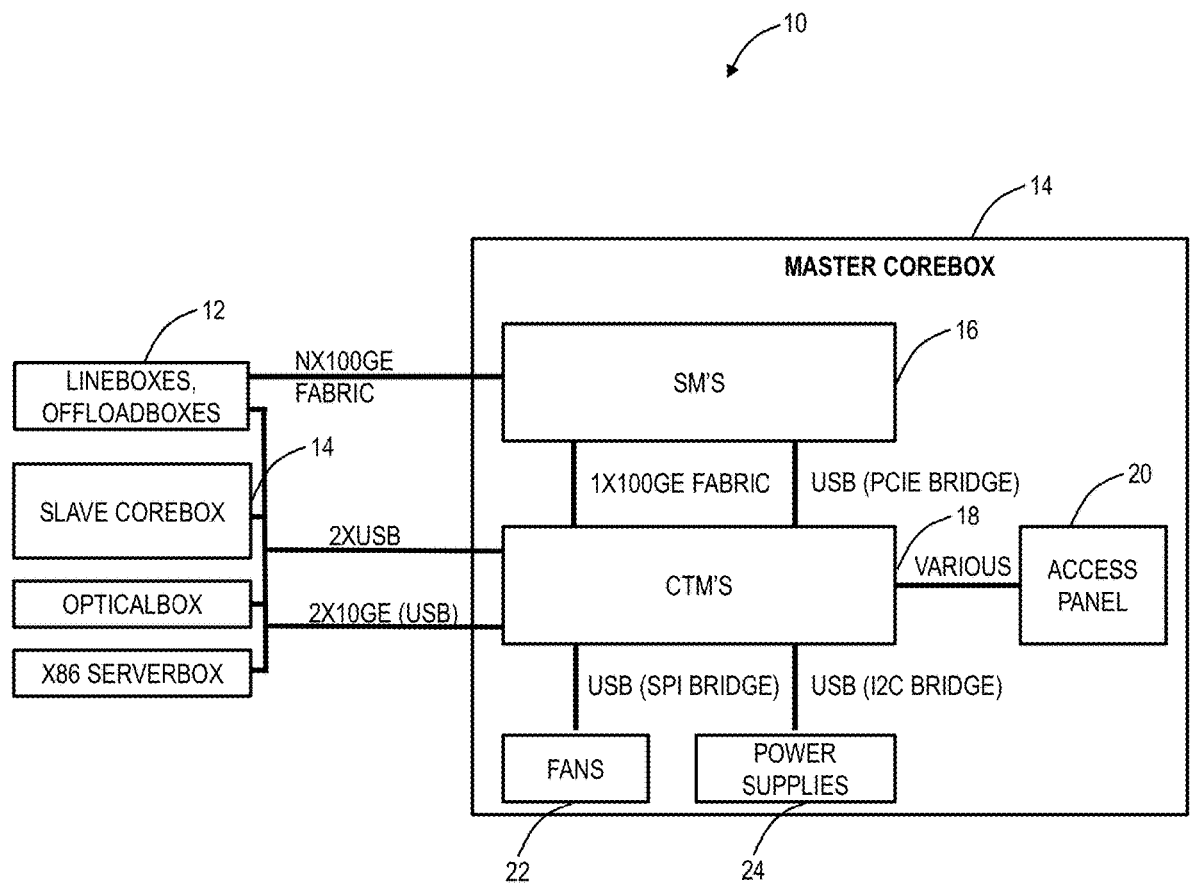
FIG. 3 is a block diagram of connectivity between the corebox, associated lineboxes, and an optional slave corebox.
Figure 4:
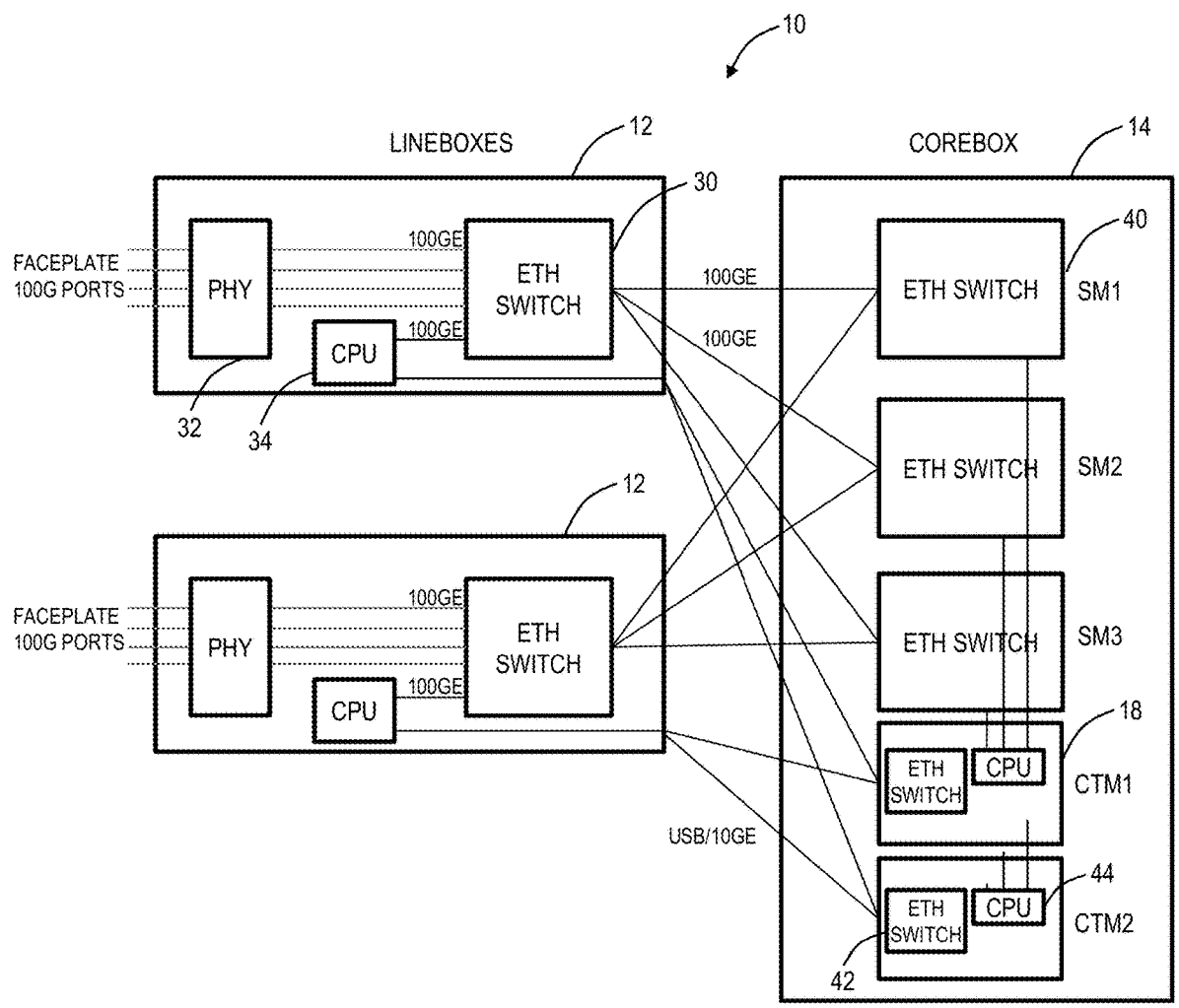
FIG. 4 is a block diagram of data plane and control plane fabric connectivity in the modular network element architecture.
Figure 5:
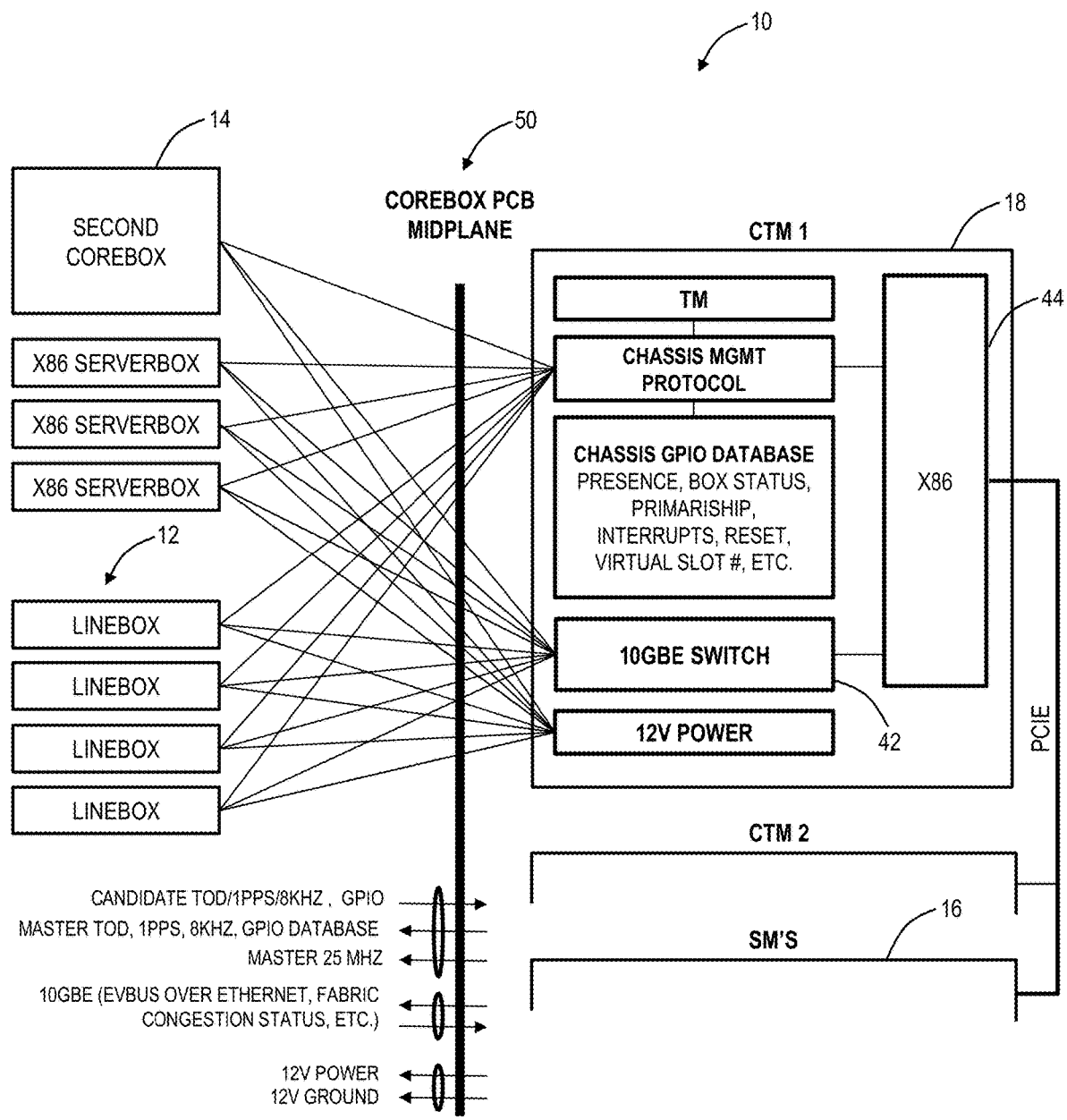
FIG. 5 is a block diagram of chassis management for the corebox.
Figure 6:
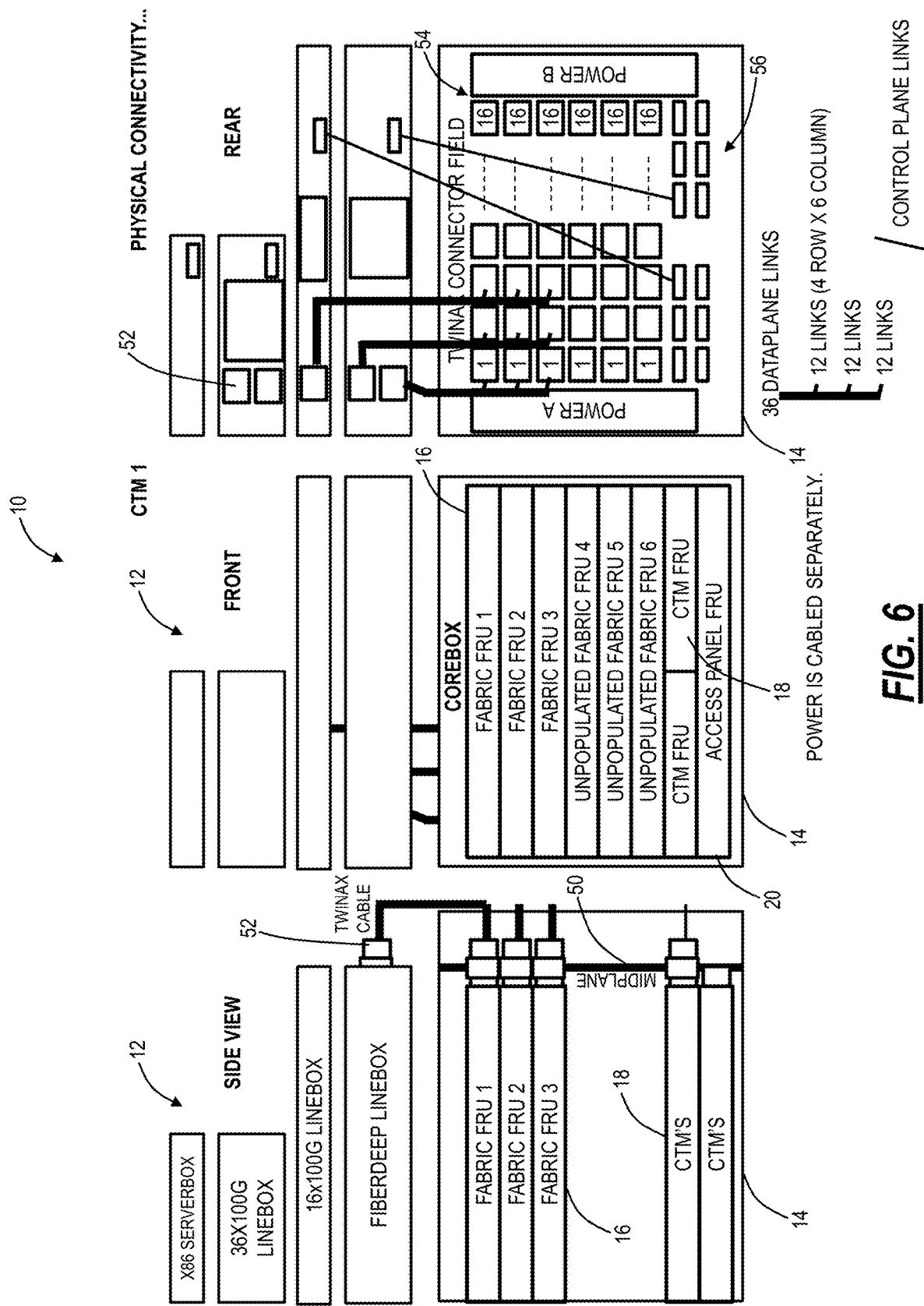
FIG. 6 is a block diagram of physical connectivity in the modular network element architecture.

FIG. 3 is a block diagram of connectivity between the corebox 14, associated lineboxes 12, and an optional slave corebox 14. FIG. 4 is a block diagram of data plane and control plane fabric connectivity in the modular network element architecture 10. FIG. 5 is a block diagram of chassis management for the corebox 14. FIG. 6 is a block diagram of physical connectivity in the modular network element architecture 10.

In FIG. 3, the master corebox 14 includes the switch modules 16, the controller modules 18, and the access panel 20. The access panel 20 can include various ports, indicators (e.g., Light Emitting Diodes (LEDs), etc.), and the like. The corebox 14 can also include fans 22 and power supplies 24. The switch modules 16 include a 1×100 GbE fabric connection to the controller modules 18 and a Universal Serial Bus (USB) connection to the controller modules 18 (e.g., a Peripheral Component Interconnect Express (PCIe) bridge). The control modules 18 can include various connections to the access panel 20, a USB connection (e.g., a Serial Peripheral Interface (SPI) bridge) to the fans 22, and a USB connection (e.g., Inter-Integrated Circuit (I2C) bridge) to the power supplies 24. External connectivity to the corebox 14 can include N×100 GbE fabric links from the lineboxes 12, a 2×USB connection from the lineboxes 12 or slave coreboxes 14, and a 2×10 GbE USB connection from the lineboxes 12 or slave coreboxes 14.

The USB management functions in the master corebox 14 include power, presence, primary arbitration, bidirectional status, health monitoring, configuration, initialization of data path, software download, interrupts, reset, LED control, I2C bridge, Universal Asynchronous Receiver-Transmitter (UART) bridge, SPI bridge, Pulse Width Modulation (PWM) bridge, General-Purpose Input/Output (GPIO) bridge, and PCIe bridge. The 10 GbE control fabric (USB alternate mode) can perform functions related to fabric congestion state transport, timing distribution (Synchronous Ethernet (SyncE) and Precision Time Protocol (PTP), direct communication between linebox 12 peers, statistics, external management network, etc. Note, in addition to lineboxes 12, the modular network element architecture 10 can include optical boxes (for Dense Wavelength Division Multiplexing (DWDM)), serverboxes (for compute or storage resources), etc. For reference, the term linebox 12 is used herein and the linebox 12 includes faceplate ports and circuitry for switching (TDM, packet, etc.). However, the linebox 12 can be an optical box (for transceivers, modems, transponders, etc.), a serverbox, etc.

In FIG. 4, two example lineboxes 12 are illustrated connected to a corebox 14. The lineboxes 12 include an Ethernet switch 30, physical (PHY) interfaces 32 connected to the Ethernet switch 32, and a processor (CPU) 34. Again, the linebox 12 and corebox 14 are illustrated, for example, with Ethernet switching, but those of skill in the art will recognize other protocols are also contemplated such as OTN, optical, etc. The physical interfaces 32 can include 100 G or similar optical transceiver, providing 100 GbE. The corebox 14 similarly includes multiple Ethernet switches 40 on the switch modules 16. The controller modules 18 also include an Ethernet switch 42 and a processor 44. The Ethernet switches 30 on the lineboxes 12 are connected to the Ethernet switches 40 on the switch modules 16 such as via 100 GbE links. The processor 34 is connected to the Ethernet switches 42 such as via USB/10 GbE.

The modular network element architecture 10 utilizes USB for the management plane based on a desire to use open interfaces for external connectivity rather than proprietary connectivity. That is, there is a lot of software infrastructure around USB, USB is widely available in chipsets, etc. USB works in an alternate mode or bridges. In the USB alternate mode, a subset of USB pins is allocated to a completely different serial protocol (10 GE in this example). So, this protocol is running parallel to the USB protocol, not on top of the USB protocol. The 10 GbE running in the alternate mode can be used for SyncE+PTP timing distribution amongst other things. For USB bridges, there are devices that bridge the following over the USB protocol: I2C, UART, SPI, PWM, PCIe, and GPIO. USB is a host:peripheral model. All transactions are initiated by the Host (usually the controller module 18). Interrupts by a peripheral are achieved via polling by the host.

FIG. 5 illustrates a corebox midplane 50 and details of the controller module 18. The controller module 18 has the processor 44 which can be x86-based and the Ethernet switch 42 which can be 10 GbE. Also, the controller module 18 includes a timing module (TM), a chassis management protocol, a chassis GPIO database, and power. The controller module 18 connects to the lineboxes 12 and other coreboxes 14 via the corebox PCB midplane 50. Any x86 in the system (including x86's on a linebox 12) can become primary or secondary for operating a high-level control plane (e.g., MPLS, Operations, Administration, and Maintenance (OAM)), but not low-level chassis management plane (e.g., the chassis management protocol, 10 GbE switch, System GPIO Database, Fabric Management PCIe, etc.). Primary control for the Chassis Management Plane is restricted to the controller modules 18.

The primary controller module 18 provides 12V power to a small Field Programmable Gate Array (FPGA) or other circuitry on each linebox 12 for the purpose of establishing the Chassis Control Plane that can power linebox 12 on and off. Any linebox 12 can provide candidate timing; the primary controller module 18 chooses one candidate clock to synchronize its own TM block, which then distributes that timing to all lineboxes. The chassis management protocol includes the establishment of a two-way protocol to indicate linebox 12 presence. The primary controller module 18 receives GPIO from all lineboxes 12 and periodically broadcasts the chassis GPIO database to all lineboxes 12. This achieves reset, interrupt, primary-ship request, primary-ship grant, etc. The protocol can have a fixed superframe size that allows accurate transmission/reception of ToD/1 pps/8 kHz to all the lineboxes. Also, each linebox 12 can display its virtual slot number on its faceplate.

In FIG. 6, an example physical connectivity is illustrated with a side view, a front view, and a rear view of the modular network element architecture 10. The modular network element architecture 10 supports mounting in a 19" (or 23") rack and FIG. 6 does not show the rack. The corebox 14 can have a depth of about 450 mm. The switch modules 16, the controller modules 18, and the access panel 20 do not need a large depth even after factoring the bend radius of a Twinax bundle (about 0.6"). The linebox 12 can have different depths, e.g., 450-1000 mm depending on the application. The lineboxes 12 can be targeted at different sizes since they do not have to work into legacy constraints for size, power, cooling, and connectivity. The modular network element architecture 10 supports front to back airflow.

The example of FIG. 6 includes the corebox 14 with 6 possible switch modules 16, with only 3 shown equipped. A few different types of lineboxes 12 are shown include an X86 serverbox which provides compute resources, a 36×100 G linebox for extra faceplate ports (e.g., double height), a 16×100 G linebox (e.g., single height, but extra depth), a fiber deep linebox (e.g., double height, extra depth), etc.

The corebox 14 includes a midplane 50 which interconnects the switch modules 16, the controller modules 18, the access panel 20, etc. The corebox 14 can connect to the lineboxes 12 via Twinax connectors 52 which are cabled from the rear of the corebox 14 to linebox carriers which are described in additional detail herein. In the rear view of FIG. 6, the lineboxes 12 can have one, two, or more Twinax connectors 52. For example, double height lineboxes 12 can have two Twinax connectors 52, single height lineboxes 12 can have one Twinax connector 52, etc. The corebox 14 can have a Twinax connector field 54 which is cabled to each of the linebox carriers and a control plane connector field 56. For example, each Twinax connector 52 can have 36 data plane links which are split into 3×12 links to the Twinax connector field 54. Of course, other implementations are also contemplated. The Twinax connector 52 can plug directly into an Ortho-Direct (from Molex), PCB backplane, or cabled backplane.

The present disclosure utilizes the term "Twinax" for the Twinax connector 52 and the Twinax connector field 54. Those skilled in the art recognize this can also include Twinaxial or any other type of electrical cabling such as coaxial cabling. That is, the electrical cabling can have any type of implementation.

Compatibility with Operations, Administration, Maintenance, and Provisioning (OAM&P)

The lineboxes 12 and the corebox 14 can implement a scalable chassis control plane with a multiplexed protocol, the ability to add x86 servers to the control plane, and the ability to elect primary-ownership outside of the corebox 14 in a linebox 12 only implementation. Of note, the modular network element architecture 10 is a hybrid between a chassis-based implementation and a pizza box-based implementation. However, operations for OAM&P is used for chassis-based management. Accordingly, the modular network element architecture 10 can be configured to emulate an existing chassis from a software perspective. For example, the modular network element architecture 10 includes a concept of a virtual slot number to assist operations personnel with locating the lineboxes 12 in a physical rack. In an embodiment, the modular network element architecture 10 can use a position sensor such as an altimeter on each linebox 12 for the purpose of establishing a monotonic virtual slot number series in the rack. This provides a unique determination of physical slot numbers that allows employing slots of different physical sizes, a way of sorting slot numbers based on the position sensor, and use of a display to show slot number.

As described herein, the scalable chassis control plane can use USB alongside a 10 GbE alternate mode for the purpose of flexible chassis management (primary ownership, remote powering, presence, status, health monitoring, configuration, software download, interrupts, reset, LED control, protocol bridges, etc.).

The chassis control plane can include the unbundling of primary-ownership: multiple primary-ownerships depending on box type and function (i.e., not limited to a corebox 14). The chassis control plane includes the ability to distribute multiple clock domains over a single link, remote powering allows a linebox 12 to be managed that does not have main power, ability to measure round-trip cable time for purpose of adjusting clock phase for each box, the ability to upgrade cabled backplane (one cable at a time) without hitting the chassis control plane, the ability of the corebox 14 to power-cycle remote lineboxes 12 or communicate with them when only their control circuitry is powered, and the ability of linebox 12 to power up without a corebox 14 in standalone or mesh configurations as part of the negotiation process.

In a rack with lineboxes 12, it is not immediately apparent how the chassis control plane should be implemented especially if it needs to emulate an existing chassis from a software perspective. It also needs to deal with N:1 redundancy, lineboxes 12 that can manage the whole chassis (standalone and mesh configurations), reduce number of links to simplify cable management, and the ability to extend the control plane to server boxes.

In the past, common practice used to be "1 pin per signal" for various signals. Historically this was due to the relative expense of SERDES capacity relative to backplane pins. This has shifted recently and allows for much greater multiplexing of many signals onto one SERDES link. Therefore, the chassis management protocol link carries Time of Day (ToD), 1 pps, 8 kHz, GPIO, presence, status, interrupts, reset, primary-ownership, etc.

The chassis management protocol is two-way between lineboxes 12, coreboxes 14, etc. and the establishment thereof between two devices is used to indicate box presence. A primary controller 18 receives GPIO from all lineboxes 12 and periodically broadcasts the chassis GPIO database to all lineboxes 12. This achieves reset, interrupt, primary-ownership request, primary-ownership grant, virtual slot number, etc. The protocol has a fixed superframe size that allows accurate transmission/reception of ToD/1 pps/8 kHz to all lineboxes 12; 25 Mhz distribution uses a dedicated link.

After a successful negotiation, any x86 in the system (including x86's on a linebox 12, i.e., the processor 34) can become primary or secondary for the chassis control plane (e.g., MPLS graceful restart, OAM), but not low-level chassis management plane (e.g., chassis management protocol, 10 GbE switch, System GPIO Database, Fabric Management). Negotiation is based on memory and processing capacities dependent on currently configured functions and reserved capacities. Primary-ownership for the chassis management plane is restricted to controllers 18 on the corebox 14 when present in the interconnected modular network element architecture 10.

The primary controller 18 provides 12V power to a small FPGA on each linebox 12 and serverbox for the purpose of establishing the chassis control plane that can power boxes on and off, hold in reset, etc. Any Box can provide candidate timing; the primary controller 18 chooses one candidate clock to synchronize its own timing module 104 block, which then distributes that timing to all boxes. Multiple clock domains can be distributed by sending frequency and 1 pps offsets relative to the main superframe phase and the single 25 Mhz clock link. This enables multiple timing domains to be distributed within a single chassis if necessary.

As part of chassis management protocol, round-trip delay measurement is employed for the purpose of measuring backplane cable length. This is used to adjust the phase of timing distribution to each linebox 12. This is a continuous process which adapts if a backplane cable is replaced.

USB is generally used to connect peripherals but using USB alongside its 10 GE alternate mode to manage a chassis is proposed in the modular network architecture 10; especially the use of USB in a multiple master mode with primary ownership negotiation. The functional partitioning between USB and 10 GE alternate mode and how they work together is proposed and offers improved implementation. For example, USB power delivery is chosen rather than PoE (Power Over Ethernet). Likewise, Module Presence is provided via USB rather than Ethernet. USB is also used to bridge various protocols such as I2C, UART, SPI, PWM, and PCIe. However, SyncE and PTP timing are distributed over Ethernet rather than USB.

Linebox Carriers

Figure 7:
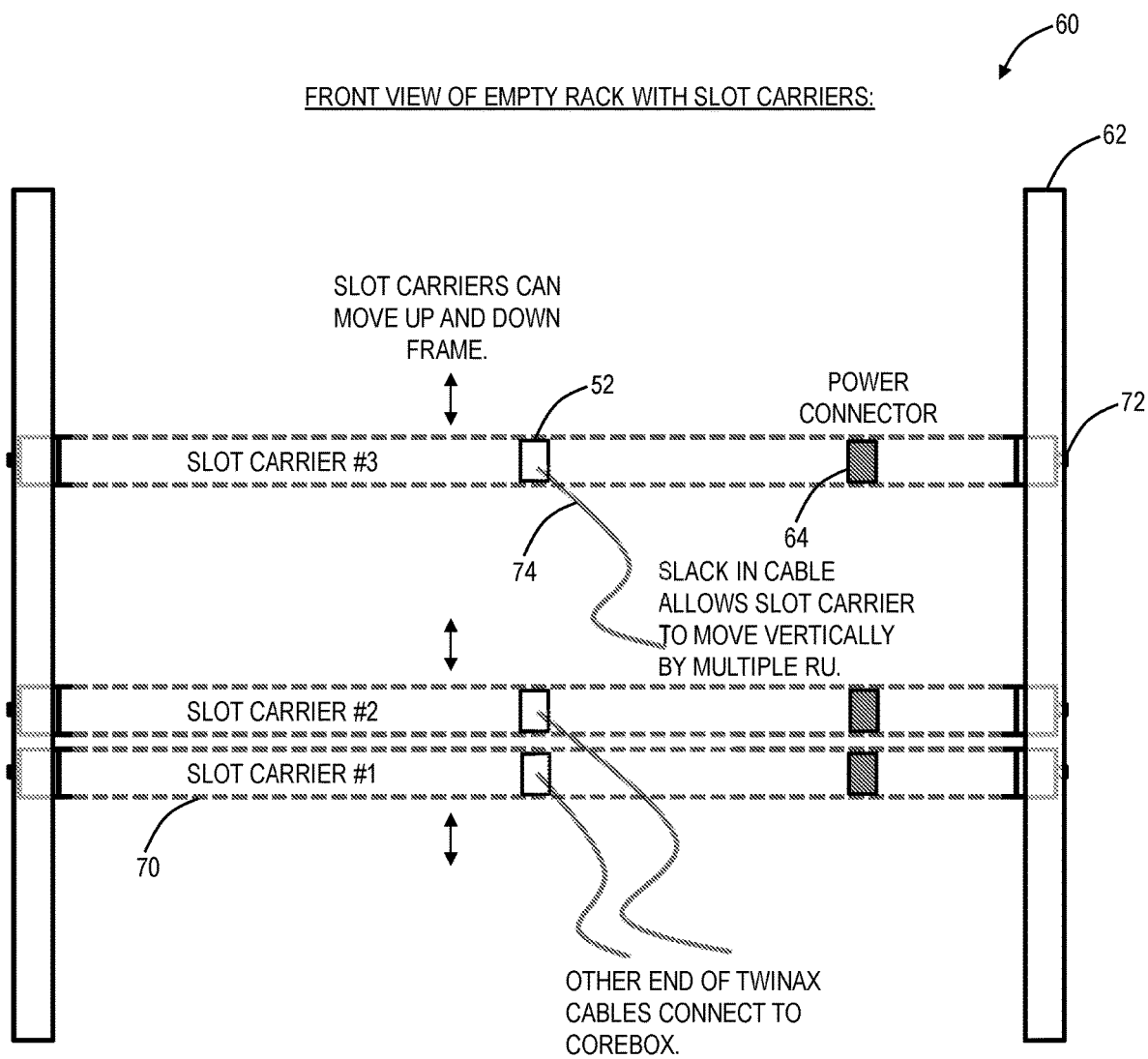
FIG. 7 is a block diagram of a rack with linebox carriers equipped therein and with no lineboxes.
Figure 8:
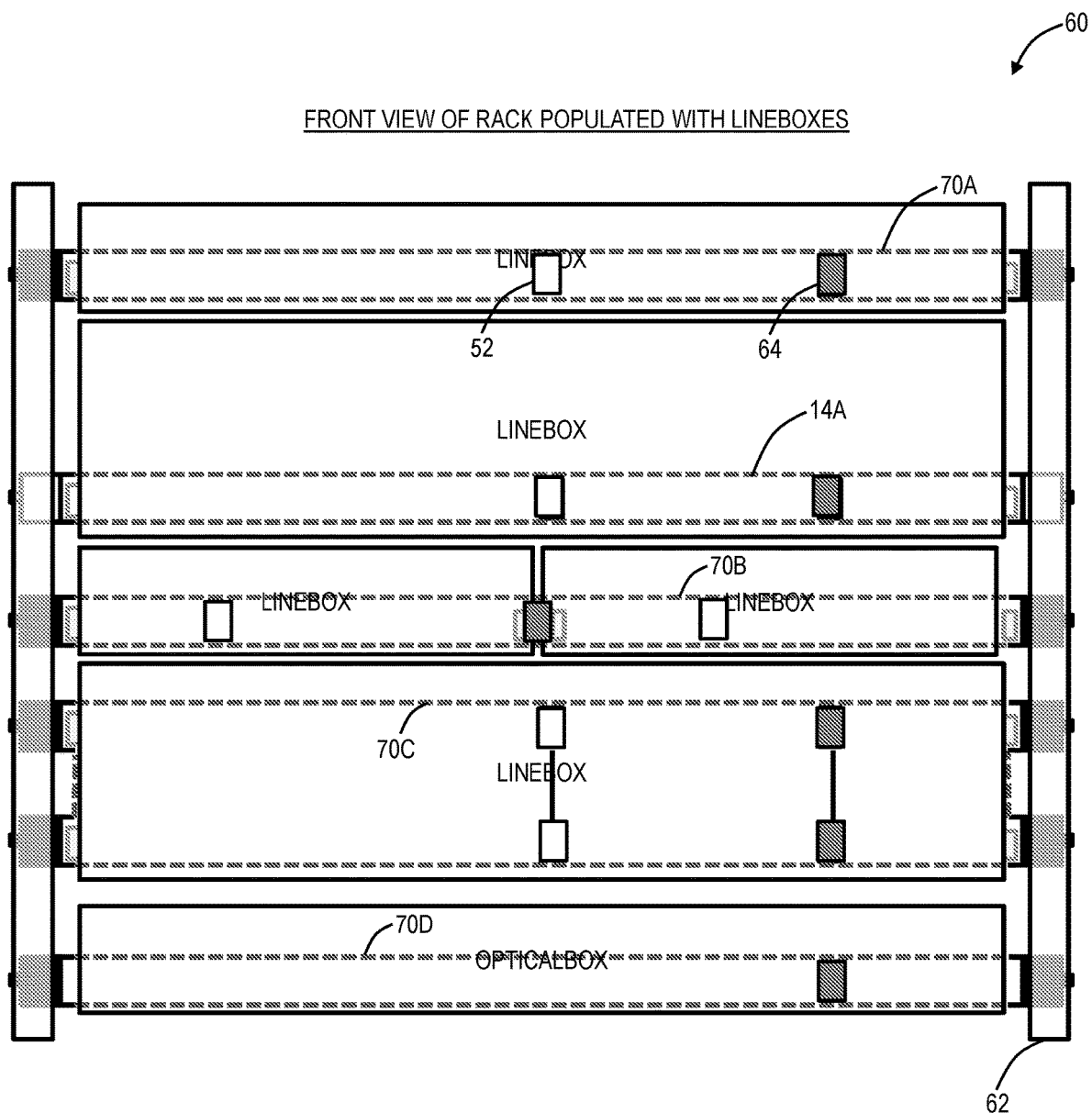
FIG. 8 is a block diagram of the rack with lineboxes in the linebox carriers.

FIG. 7 is a block diagram of a rack 60 with linebox carriers 70 equipped therein and with no lineboxes 12. FIG. 8 is a block diagram of the rack 60 with lineboxes 12 in the linebox carriers 70. The rack 60 can be a standard telecom/ Datacom 19" rack with a rail 62 on each side. The rail 62 can be a C-channel rail (C being the shape of the rail). The linebox carriers 70 can be an all-metal structure for physically supporting an associated linebox 12 and the Twinax connector 52 and a power connector 64. The linebox slot carrier 70 has no PCB or electronics thereon (other than the connectors 52, 64), i.e., the linebox slot carrier 70 is passive. In an embodiment, the linebox slot carrier 70 includes retractable pins 72 which lock the linebox slot carrier 70 into place in the rail 62. The Twinax connector 52 is held in a fixed position at the rear of the linebox slot carrier 70. The linebox carriers 70 can be moved up and down in the rack 60 (also known as a frame) and cabling 74 connected to the linebox carriers 70 includes slack allowing for the linebox slot carrier 70 to be moved vertically by multiple Rack Units (U). The cabling 74 connects to the corebox 14.

In FIG. 8, example lineboxes 12 are shown placed in the linebox carriers 70. The linebox 12 slides horizontally (front-to-back) into the linebox carrier 70. The linebox carrier 70's primary function is to provide a fixed location for the Twinax connector 52 to allow insertion of a linebox 12 without requiring rear access. The cable lengths can be factory-configured to suit customer's specific configuration of linebox 12 sizes.

A common carrier design for the linebox slot carrier 70 can be applied in variants dependent on the requirements of different lineboxes 12. FIG. 8 illustrates four example variations of the linebox slot carrier 70A, 70B, 70C, 70D. A linebox slot carrier 70A includes one Twinax connector 52 and one power connector 64, and can be used to support a single or double height linebox 12. A linebox slot carrier 70B includes two Twinax connectors 52 and one power connector 64 in the middle. The linebox slot carrier 70B supports half-sized lineboxes 12. A linebox slot carrier 70C includes two Twinax connectors 52 and two power connector 64 to support a larger height linebox 12. Finally, a linebox slot carrier 70D includes no Twinax connectors 52 and one power connector 64 such as for an optical box or the like which does not need fabric plane connectivity to the corebox 14.

Figure 9:
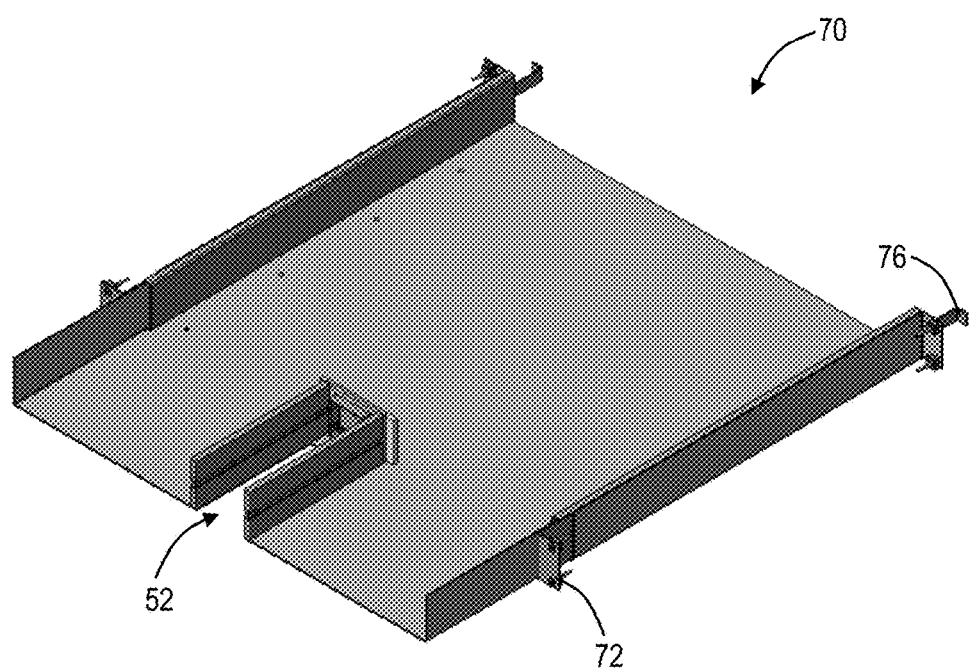
FIG. 9 is a perspective diagram of the linebox slot carrier.
Figure 10:
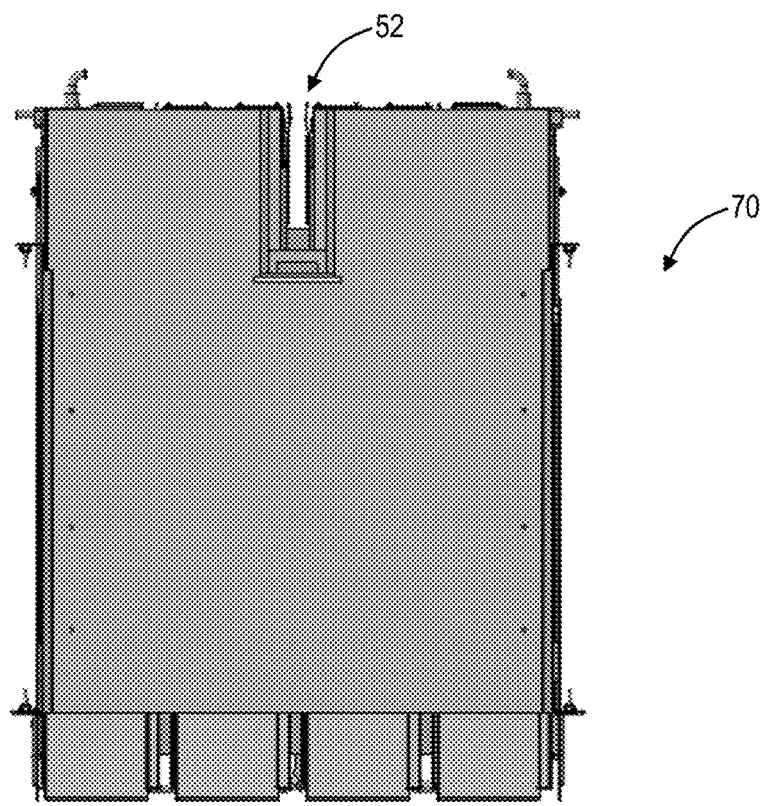
FIG. 10 is a bottom view of the linebox slot carrier.

FIG. 9 is a perspective diagram of the linebox slot carrier 70 and FIG. 10 is a bottom view of the linebox slot carrier 70. The linebox slot carrier 70 includes the retractable pins 72 which can include a spring-loaded mechanism that grabs into holes in the rail 62 and has a "push to disengage" feature which avoids the need for side or rear access. For example, a latch 76 can be pulled to disengage the pins 72 so that the linebox slot carrier 70 can be moved up and down.

Variable Pitch Backplane Virtual Slots

With the lineboxes 12 in the modular network element architecture 10 with cabled backplane connections, one can take advantage of their physical flexibility to create the slot carriers 70 populated with lineboxes 12 whose position can shift within a range. This allows linebox 12 modules of different faceplate heights to be stacked together in a chassis without wasting fabric capacity.

The modular network element architecture 10 allows the customer to retain the ability to replace a linebox 12 without having to go to the back of the chassis to disconnect/ reconnect fabric cables. A cable receptacle (the connectors 52, 64) is attached to the slot carrier 70 and the slot carrier 70 can slide vertically on the chassis within a range (e.g., up to 4 U) provided by extra slack in the backplane cabling. A vertical physical guide mechanism (e.g. C-channel in the rail 62) can provide the sliding rail on the chassis for the slot carriers 70 and holes to lock in various slot carrier positions on a 1 U granularity. The slot carrier 70 has pins 72 that can be depressed to move it up or down and then lock into the C-channel's holes—all while the backplane cable is still attached. The slot carrier 70 also provides standard header alignment mechanisms to allow a linebox 12 module to plug into the slot carrier 70. The slot carriers 70 themselves do not need to be moved by the customer to provide value—factory configurability allows unique slot size configurations to suit a given customer. A customer can modify slot positions themselves based on how much cable slack was built in.

The slot carrier 70 can have multiple positions for separate cable bundles. Not all cable bundles need to be populated, which allows the linebox 12 to be given the amount of fabric bandwidth it needs without wasting fabric bandwidth as per conventional PCB backplane systems.

Rack View

Figure 11:
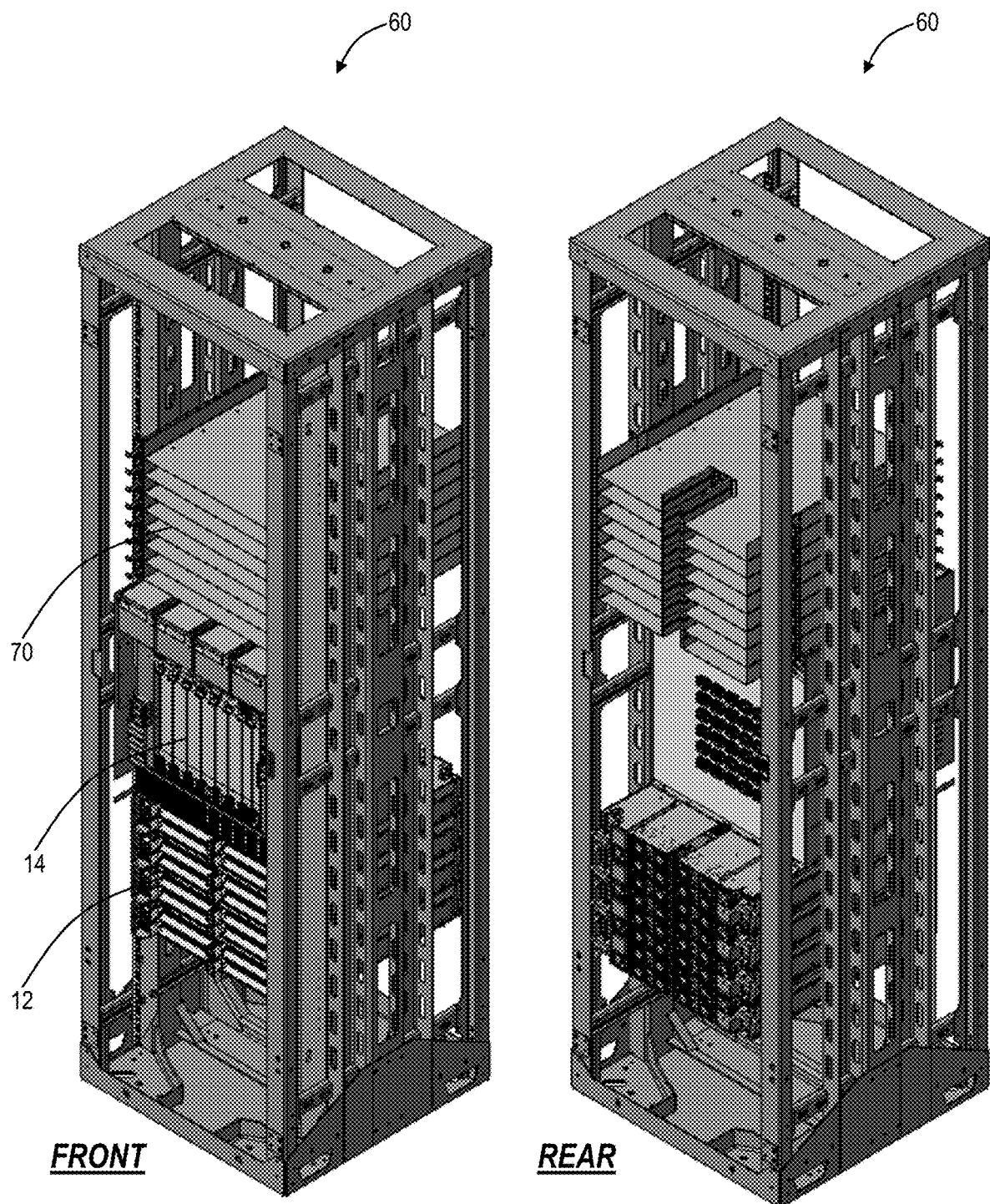
FIG. 11 is a perspective diagram of a front view and rear view of a rack with a corebox, four lineboxes in associated linebox carriers, and eight empty linebox carriers.
Figure 12:
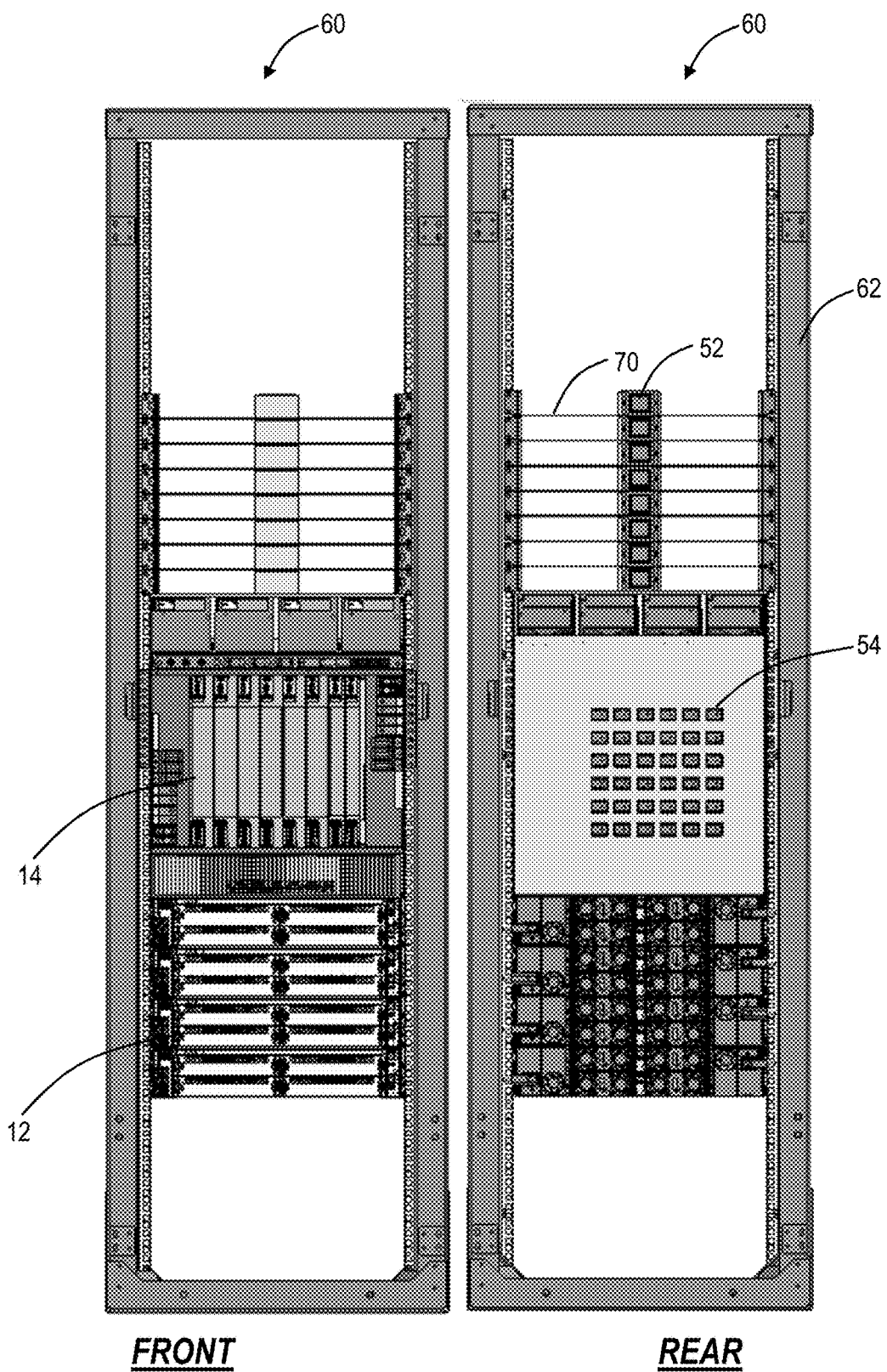
FIG. 12 is a front view diagram and a rear view diagram of the rack from FIG. 11.
Figure 13:
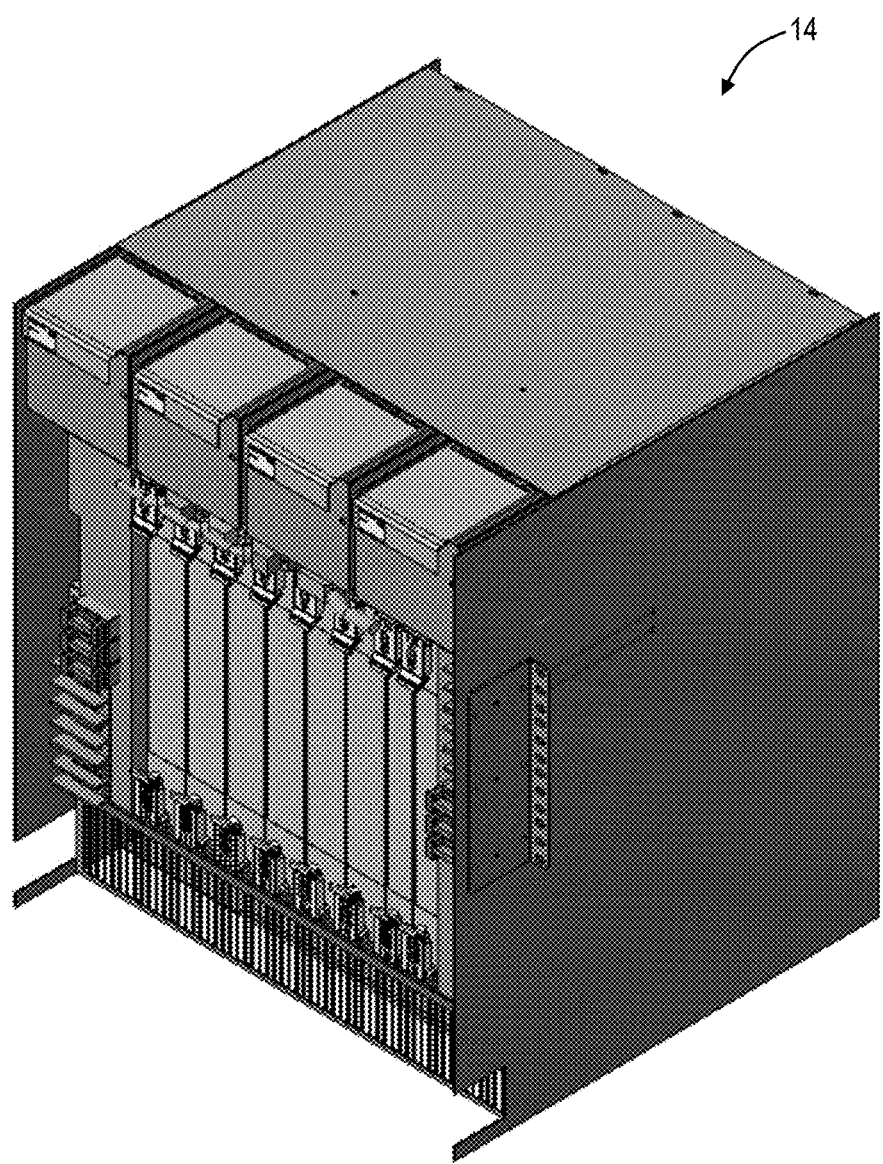
FIG. 13 is a perspective diagram of the corebox.

FIG. 11 is a perspective diagram of a front view and rear view of a rack 60 with a corebox 14, four lineboxes 12 in associated linebox carriers 70, and eight empty linebox carriers 70. FIG. 12 is a front view diagram and a rear view diagram of the rack 60 from FIG. 11. FIG. 13 is a perspective diagram of the corebox 14.

The modular network element architecture 10 can be deployed in a variety of configurations with lineboxes 12 and optionally with the corebox 14 as a centralized chassis with cable subtended to the lineboxes 12 in the same rack 60 or different rack. The corebox 14 can include modules for the switch modules 16, controller 18, timing, etc. which can be linked via the midplane 50 in the corebox 14.

The switch modules 16 can connect to the lineboxes 12 as described herein via electrical or optical cabling at the rear of the rack 60 and the front of the rack 60 is used for customer-facing interfaces. As described herein, the rear cables are separated into bundles that match the fabric module granularity. The control plane signals can be in the same cable bundle or a physically separate cable bundle from the fabric cables. The control plane cable bundle includes a multiplexed protocol that signals ToD/1 pps/ frequency, presence, status, primary ownership, interrupts, reset, position identification, Ethernet, and power.

The corebox 14 can power a subset of control circuitry on the lineboxes 12. Different redundancy ratios are supported for different functions such as local Ethernet Fabric (N:1), Timing Distribution (1:1), Chassis management (1:1), and MPLS Control Plane (N:1) and a switchover of one function does not force a switchover of the other function, and each function can reside on different modules. The access panel 20 for the modular network element architecture 10 is centralized in the corebox 14 and can serve all lineboxes 12 in such a Switch System. Advantageously, cooling of the corebox 14 and the lineboxes 12 is independent from one another and airflow is significantly improved.

The modular network element architecture 10 includes physically separate devices (lineboxes 12 and the corebox 14), but it is managed as a single entity, e.g., alarms, statistics, Performance Monitoring (PM) data, etc. are aggregated and the modular network element architecture 10 is a single network element. When the corebox 14 is omitted, a single linebox 12 can virtualize the corebox 14 management functions such as the control plane and fabric management.

Ethernet Fabric

Various existing solutions hash an Ethernet flow to a specific path that exists for the lifetime of the flow, such as Link Aggregation, for example. In Ethernet fabrics, a slow control plane routes new flows away from congested hotspots when elephant flows cause hot spots and unbalance the fabrics, but this is a slow process which results in congestion aliasing. An elephant flow is an extremely large (in total bytes) continuous flow over a network link. Elephant flows, though not numerous, can occupy a disproportionate share of the total bandwidth over a period of time. The conventional approach is to break up elephant flows at their natural gaps in order to move links without causing misordering. Of course, the conventional approach cannot break up an elephant flow unless the elephant flow already has gaps.

Further, the conventional approach estimates path latency based on buffer fill levels, but this is not as accurate as a timestamped approach with out-of-band timing distribution. Also, the conventional approach does not utilize TDM for the purpose of improving data traffic in an Ethernet Fabric. To that end, the modular network element architecture 10 requires new approaches in terms of the Ethernet fabric.

In various embodiments, an Ethernet fabric in the modular network element architecture 10 can create gaps in large continuous Elephant flows by artificially forcing momentary buffering such that the gap is no larger than the path delay difference between the current path and a new path. This allows a single flow to be spread over many links and therefore improves Ethernet Fabric utilization. The modular network element architecture 10 can also include the addition of post-buffering and shaping to OTN segmentation to create evenly-spaced mice flows for the purpose of improving Ethernet Fabric utilization (a mouse flow is the opposite of an elephant flow).

The modular network element architecture 10 uses out-of-band timing distribution coupled with TDM Segmentation and Reassembly (SAR) to measure fabric latency on all paths. The modular network element architecture 10 can spread TDM across paths evenly for the purpose of measuring all paths through the fabric without introducing probe packets. Specifically, the TDM packet SAR header (sequence number) is used to estimate relative path latency deltas and this is fed into a path selection algorithm. The out-of-band congestion notification distribution is used over the cabled backplane to estimate path delay tolerant of high congestion, which is when path delay needs to be most accurate. The out-of-band path selection broadcast allows every linebox 12 to build a global path selection state for the purpose of preventing flapping when flows are moved away from congested links.

The TDM SAR is used to actively balance an Ethernet fabric whose data flows are resulting in an unbalanced fabric. The path selection algorithm has unique rules for unicast, multicast, and TDM flows. Together with the above, restricting the top Class of Service (CoS) to TDM-only, undershaping traffic is proposed for the purpose of fabric speedup to keep latency within a target range. Path flapping is prevented by communicating path selection status between lineboxes 12 for the purpose of preventing multiple lineboxes 12 from moving large flows to the same link, causing congestion, and all moving flows back, and repeating the cycle. Use of hash to make common decisions about which flows get to move.

Figure 14:
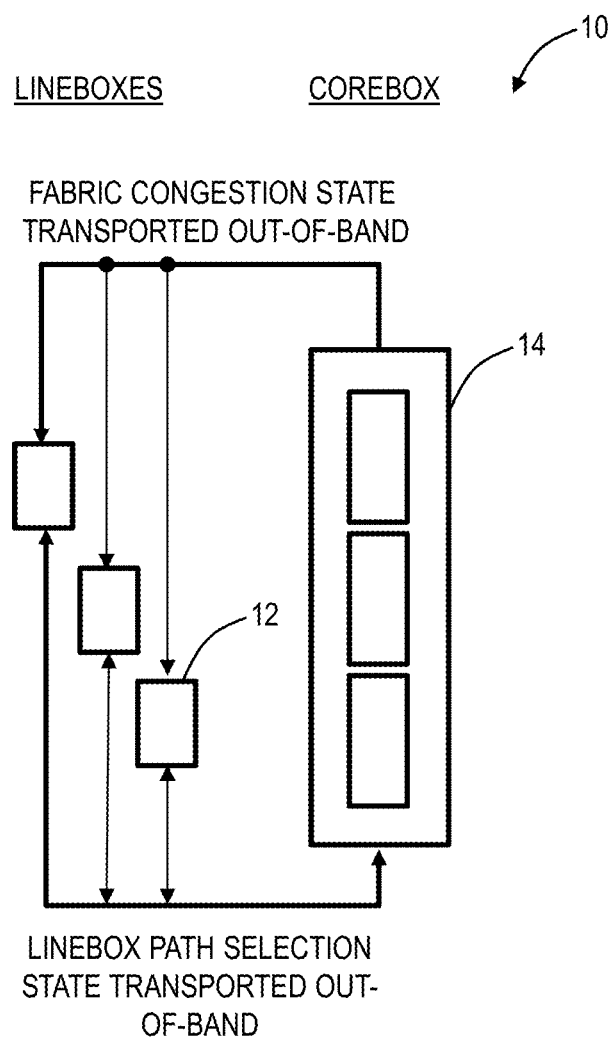
FIG. 14 is a block diagram of communication between the corebox and the lineboxes.

FIG. 14 is a block diagram of communication between the corebox 14 and the lineboxes 12. The communication is through a control plane using a 10 GbE or 100 GbE link. The corebox 14 maintains a system database of path state (such as congestion status, path reservation status, etc.). It is an event-driven publish/subscribe model. This allows a linebox 12 to make a path selection decision based on the global system state in the modular network element architecture 10 and scheduled path selection from other lineboxes 12 rather than just its local state. Negotiated path selection based on the global state prevents path flapping whereby all lineboxes 12 move a large flow onto an empty link, congest it, and move their flows away from that link again, etc. The fabric congestion state and the linebox path selection state are transported out-of-band.

Figure 15:
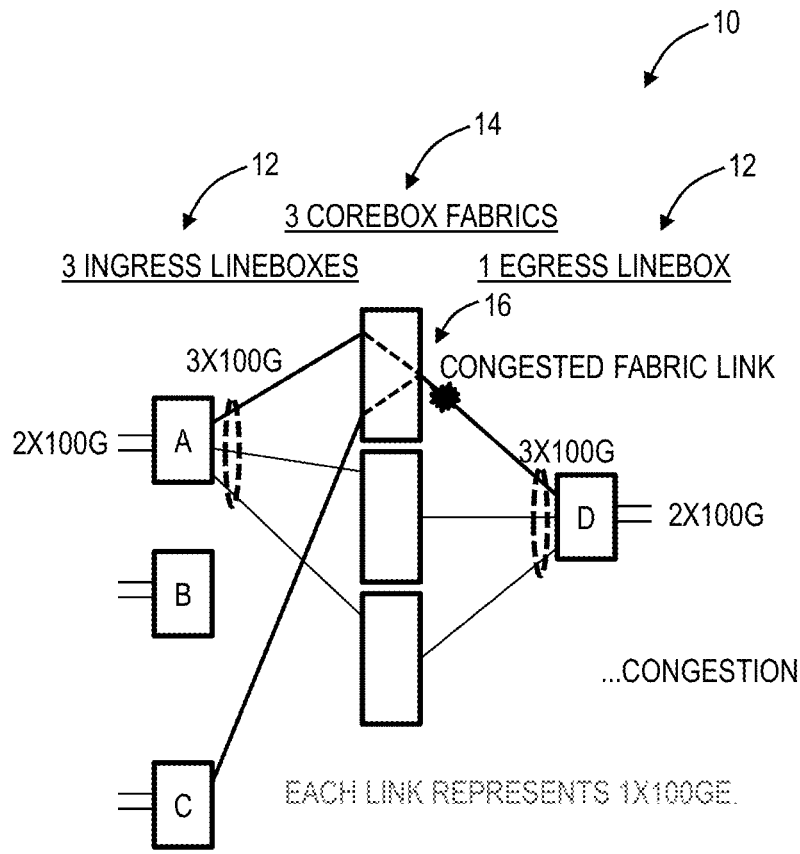
FIG. 15 is a logical diagram of Ethernet paths through the modular network element architecture with and without congestion.
Figure 15:
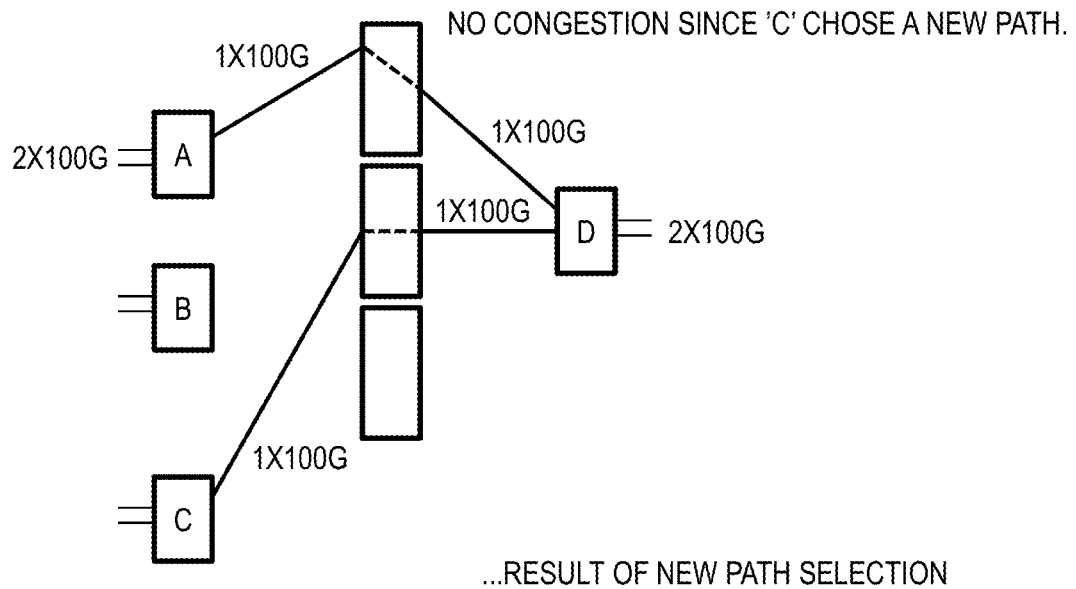

FIG. 15 is a logical diagram of Ethernet paths through the modular network element architecture 10 with and without congestion. In this example, there is three ingress lineboxes 12A, 12B, 12C, a corebox 14, and one egress linebox 12D. The ingress lineboxes 12A, 12B, 12C each connect to one switch module 16 at 100G in the corebox 14 as does the egress linebox 12D. At the top portion of FIG. 15, the ingress lineboxes 12A, 12C each provides a flow to the first switch module 16, resulting in congestion on the link between the switch module 16 and the egress linebox 12D. At the bottom portion of FIG. 15, the ingress linebox 12C selects a new path thereby alleviating the congestion.

Figure 16:
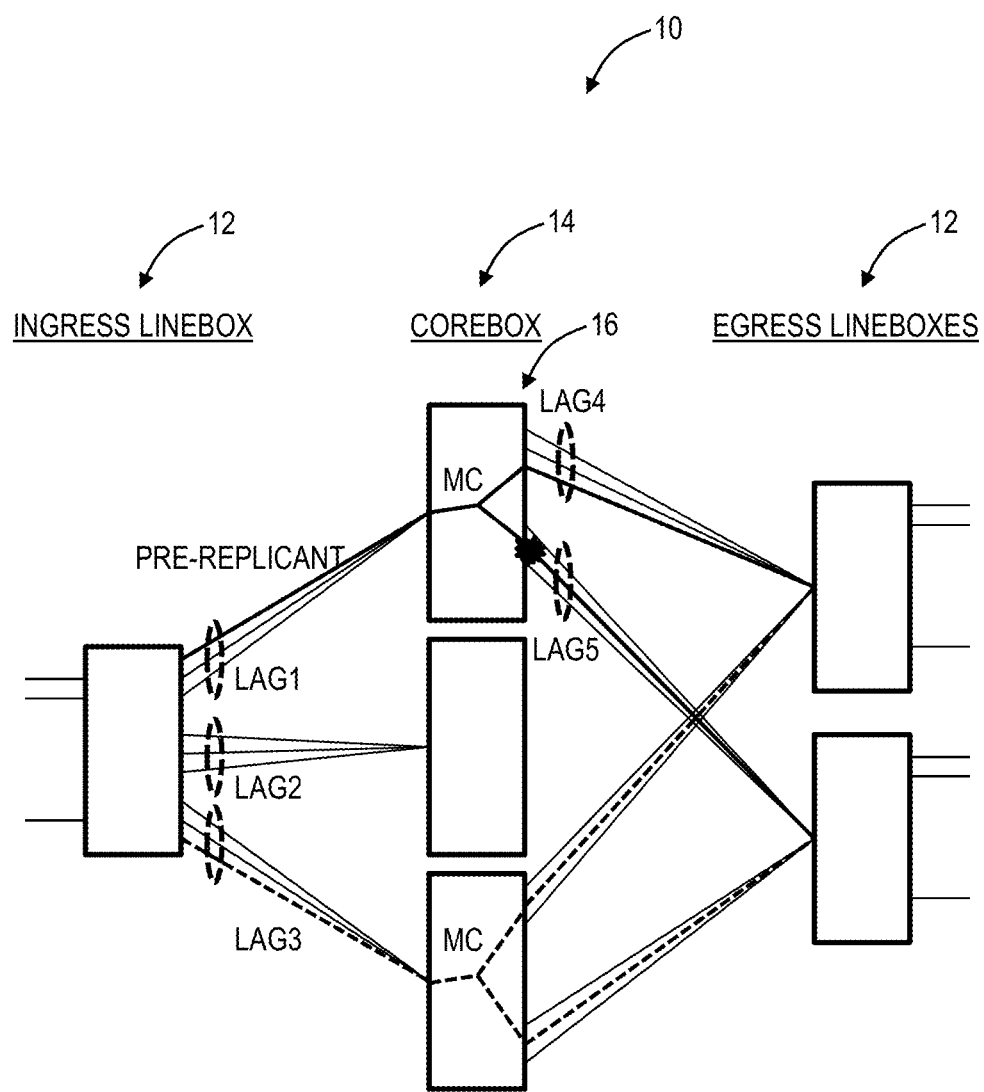
FIG. 16 is a logical diagram of Ethernet paths through the modular network element architecture illustrating multicast.

FIG. 16 is a logical diagram of Ethernet paths through the modular network element architecture 10 illustrating multicast. In this example, there is one ingress linebox 12 and two egress lineboxes 12 with the corebox 14 in-between. There are three Link Aggregation Groups (LAGs) LAG1, LAG2, LAG3 between the ingress linebox 12 and the switch modules 16 in the corebox 14. There are two LAGs, LAG4, LAG5 between the first switch module 16 and the egress lineboxes 12. TDM protection requires 1:N multicast (MC) where N≤4. For an MC replicant flow, a local Fabric Element (FE) performs the load balancing function on the linebox 12, corebox 14, etc. One replicant might see congestion and the other might not. The congested replicant cannot move to a different fabric element because that would require the MC to happen at the ingress linebox 12 and could lead to Fabric Input Blocking. If all members of LAG5 are congested, then the pre-replicant flow must be moved to a different Fabric Element where both replicant paths are uncongested. This decision is made by the ingress linebox 12 based on corebox 14 congestion state.

Figure 17:
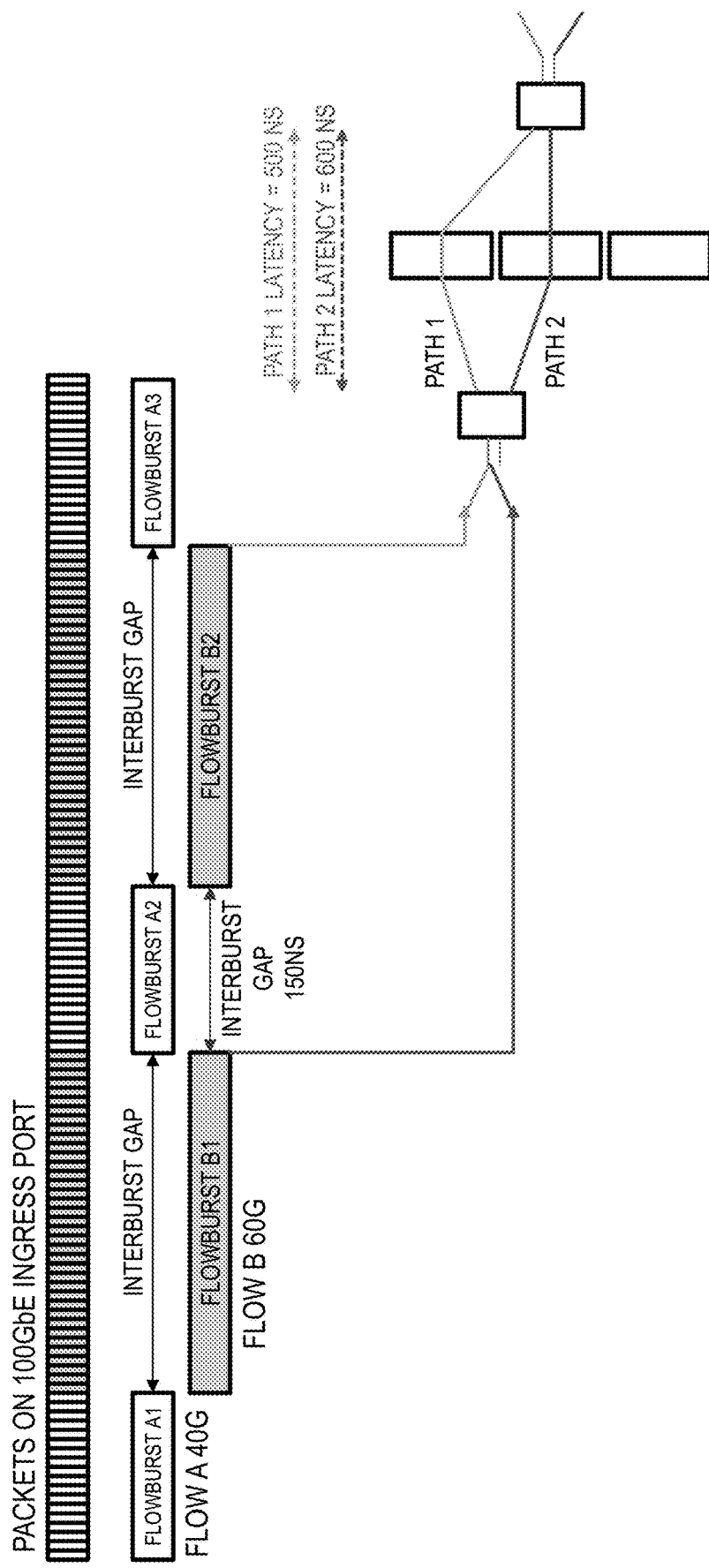
FIG. 17 is a logical diagram of an Ethernet multi-path data flow through the modular network element architecture.

FIG. 17 is a logical diagram of an Ethernet multi-path data flow through the modular network element architecture 10. FIG. 17 illustrates packets on a 100 GbE ingress port, a flow A which is 40 Gb/s, and a flow B which is 60 Gb/s, both of the flows A, B are elephant flows which can cause poor load-balancing and therefore poor fabric utilization (some links congested and others underutilized). There are inter-burst gaps and flowbursts for each of the flows A, B, and there can be two paths 1, 2 in the modular network element architecture 10 with a latency of 500 ns, 600 ns, respectively. The modular network element architecture 10 can include sending the different flowbursts on the different paths to avoid congestion and underutilization. As described herein, a flowburst is part of a flow, such as an elephant flow, between interburst gaps. Also, each flowburst can take a different path in the fabric as described herein.

Figure 18:
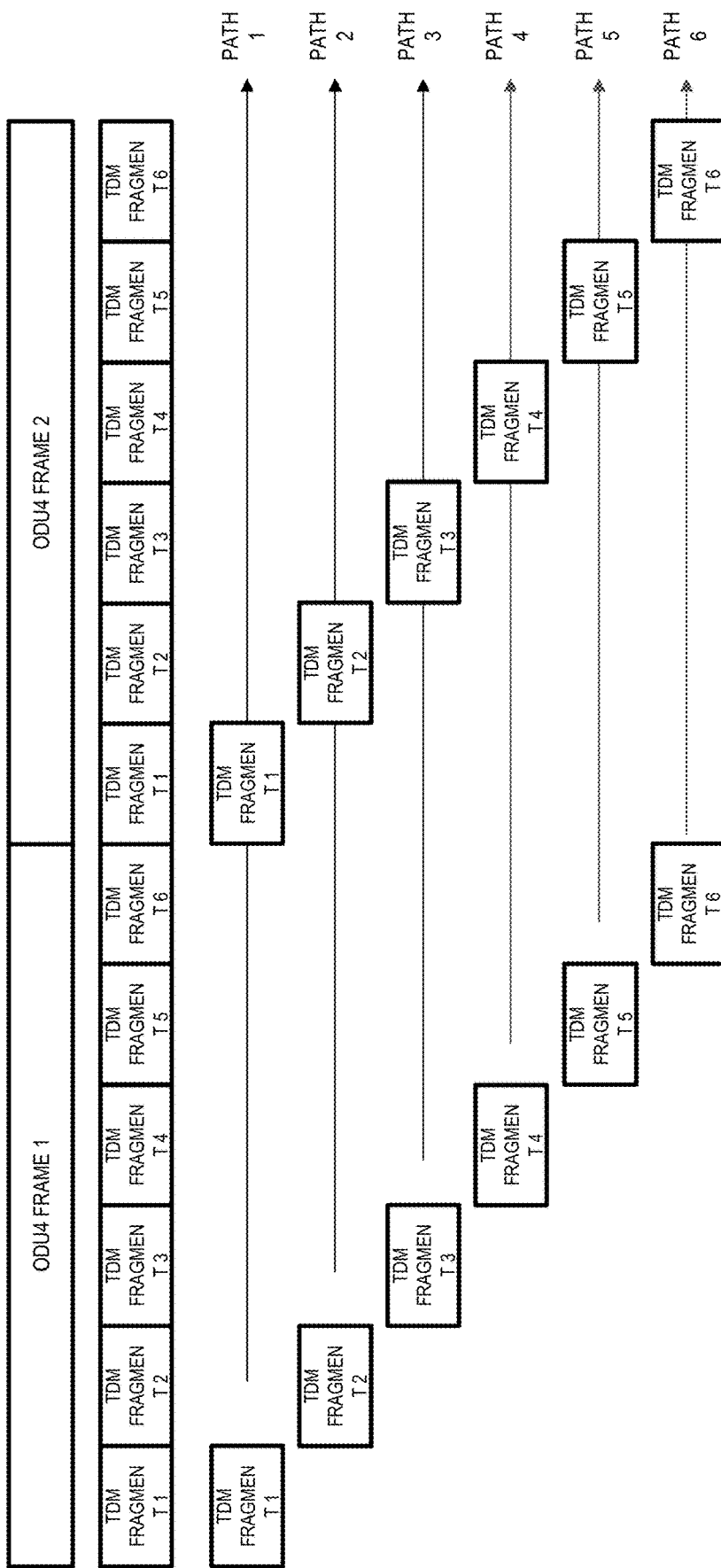
FIG. 18 is a logical diagram of a TDM multi-path data flow through the modular network element architecture.

FIG. 18 is a logical diagram of a TDM multi-path data flow through the modular network element architecture 10. Note, an Optical Data Unit level 4 (ODU4) does not fit in a 100 GbE and even if it did, it would be an elephant flow that unbalances the fabric. Accordingly, TDM mice flows are spread across all fabric links as shown in FIG. 18 on six example paths. Fragments on different paths can arrive out of order, so they are given sequence numbers and buffered/reassembled in order. By breaking ODU4 into many mice flow fragments, bandwidth is spread evenly across all fabric paths which results in good fabric utilization. TDM fragments carry timestamps that allow measurement of path latency on all paths to be continuously measured.

Forced Saps on Elephant Flows

Figure 19:
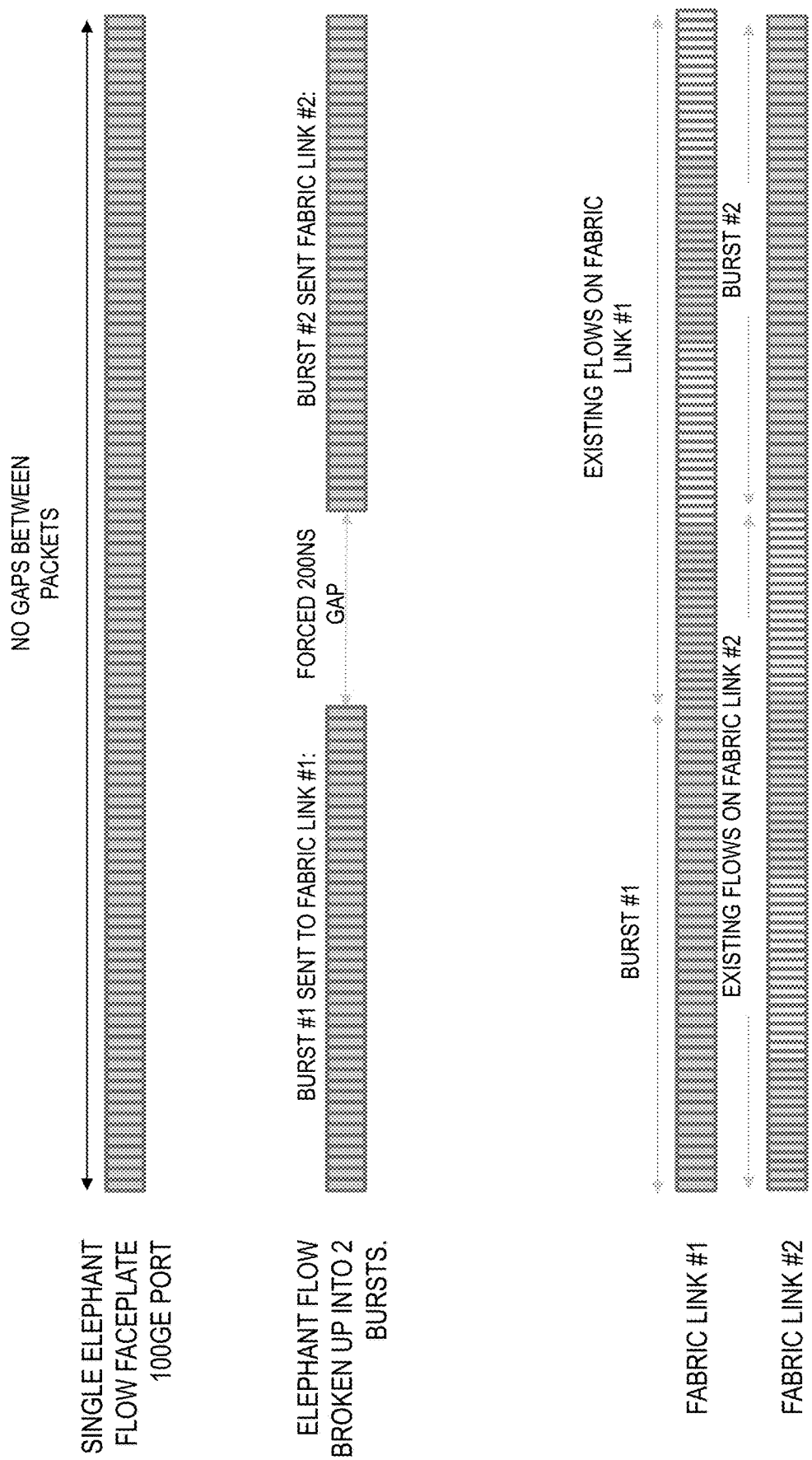
FIG. 19 is a logical diagram of Ethernet flows.

FIG. 19 is a logical diagram of Ethernet flows. First, a single elephant flow is shown on the faceplate 100 GbE port, i.e., with no gaps between packets. The problem is this flow would normally want to stay on a single fabric link to prevent re-ordering. The fabric might have 150 Gb/s of bandwidth available, but that bandwidth might be spread over 15 fabric links, so a given link only has 10 Gb/s of bandwidth available. The Elephant Flow does not fit anywhere and causes congestion regardless of which link it is put on.

Next, the elephant flow is broken up into two bursts. The ingress linebox 12 circuitry (e.g., FPGA) temporarily buffers the elephant flow and introduces a forced gap. This gap allows the ingress Ethernet switch to send the first burst on link #1, the second burst on link #2, the third burst on link #3, etc. This allows the elephant flow to be spread into the available bandwidth on many fabric links and therefore achieve higher fabric utilization.

The forced gap is not a static value. The size of the gap is determined by the difference in latency between the previous path and the new candidate path. If the candidate path is higher latency, then no gap needs to be introduced. But the path selection algorithm would normally try to find lower latency paths where possible. In those cases where the candidate path is lower latency, Forced_Gap_size=Latency_old_path−Latency_candidate_path+margin. Note, this process does not increase the latency of the original flow relative to the latency of the original path.

The bottom two flows in FIG. 19 illustrate fabric links #1, #2 which handle the different bursts created by the forced gap. Note, the forced gap in the elephant flow does not waste bandwidth because the ingress Ethernet switch fills the gaps with other flows. In a combined TDM/Data application, TDM generates lots of 512 B mice flows that can easily fill in the gaps. Also, elephant flows only need to be broken up if there is not a sufficiently large and contiguous bandwidth block on a fabric link or if they do not have natural gaps. Therefore, gap forcing in elephant flows can be dependent on congestion, fabric contiguous bandwidth, etc.

Path Selection

By default, the path selection can be static at startup or at the addition of a new linebox 12 through a static mapping of ingress ports to egress ports. This approach for the linebox 12 spreads ingress ports evenly over all available fabrics and fabric links, and for the corebox 14 spreads all ingress ports evenly within each linebox 12 trunk. After this static configuration and depending on traffic flow, there can be congestion so the paths must be modified dynamically by the path selection algorithm.

The path selection algorithm is implemented in the modular network element architecture 10 and includes monitored metrics. Specifically, for each ingress flow, a counter is maintained that measures the most recent Interburst Gap and flow bandwidth. Also, the measure of path latency is maintained for every path (between lineboxes 12, corebox 14). Since TDM fragments are spread over all paths, it is possible to use their timestamps to continuously estimate latency on all paths. If no TDM is present, internal Delay Measurement Messages (DMMs) can be generated for this purpose. An exponential moving average can be used to smooth the latency estimates.

Again, the corebox 14 provides out-of-band communication of fabric congestion states to all ingress lineboxes 12. Specifically, this exchange is not in-band since congestion state packets could be affected by the congestion they are trying to report. Also, out-of-band communication of the path selection state is broadcast by all lineboxes 12.

The flowbursts define the path selection granularity. A flowburst is eligible to follow a different path from the previous flowburst if its interburst gap is larger than the difference in latency between existing path (high latency) and new path (low latency). This allows flows to be moved dynamically (rather than static hash-based load balancing).

For dynamic path selection and manual override, flows can be moved manually without introducing packet reordering. This is done by intentionally pausing the flow and allowing it to buffer up until an artificial interburst gap is created, which allows the flow to be moved automatically by the path selection algorithm or manually.

The linebox 12 makes the path selections based on congestion estimates of the whole path. It can choose a new path inside or outside of a LAG trunk. The corebox 14 makes path selections only within a LAG trunk. Unreachable paths are not used. This can be due to faulty links, missing fabrics, etc.

For a unicast flow, every time a new flow starts or there is a sufficiently large flow burstgap, then a new path with least latency is chosen. The delta in latency between the old path and a new path must be over a threshold for the flow to be moved to prevent unnecessary movement for negligible gains.

The local Fabric Element on the linebox 12 performs the load balancing function for each LAG for both unicast and multicast. But for multicast, it is possible that all members of a given fabric LAG are congested, so the pre-replicant flow must be moved to a different Fabric Element that has uncongested LAG's. This decision is made by the ingress linebox 12 based on corebox 14 congestion state. Note, replicant flows are restricted from being on different Fabric Elements because that would require MC at the ingress linebox 12 which could lead to Fabric Input Blocking.

For TDM, the OTN over Packet Fabric Protocol (OFP) Implementation Agreement (November 2011) from the Optical Internetworking Forum, the contents of which are incorporated by reference, can be used. Here, TDM is broken up into many small flows that require a SAR function to reassemble in the correct order. TDM flows can be moved at will without concern for packet ordering because the SAR will take care of correcting the order. The path selection algorithm is aware of TDM and non-TDM flows; The TDM flows are exempt from the interburst gap path selection requirements. In the case that the fabric is unaware of the flow type, the SAR function can add post-buffering to create evenly spaced interburst gaps to the TDM flow.

For path flapping, a given linebox 12 has a view of the Fabric Congestion state, but it does not have a view of what the other linebox 12's are doing. Two lineboxes 12 could make the simultaneous decision to move a flow to an uncongested link and thereby cause it to become congested. Both lineboxes 12 could then move their flows away leading to flapping. Each linebox 12 broadcasts its Path Selection State to the other lineboxes 12 (and corebox 14) so that all can build a view of the Global Path Table. For all the flows on a congested link, the flow with the highest hash is the only one moved away during the current congestion interval.

TDM Over Ethernet Fabric

Figure 20:
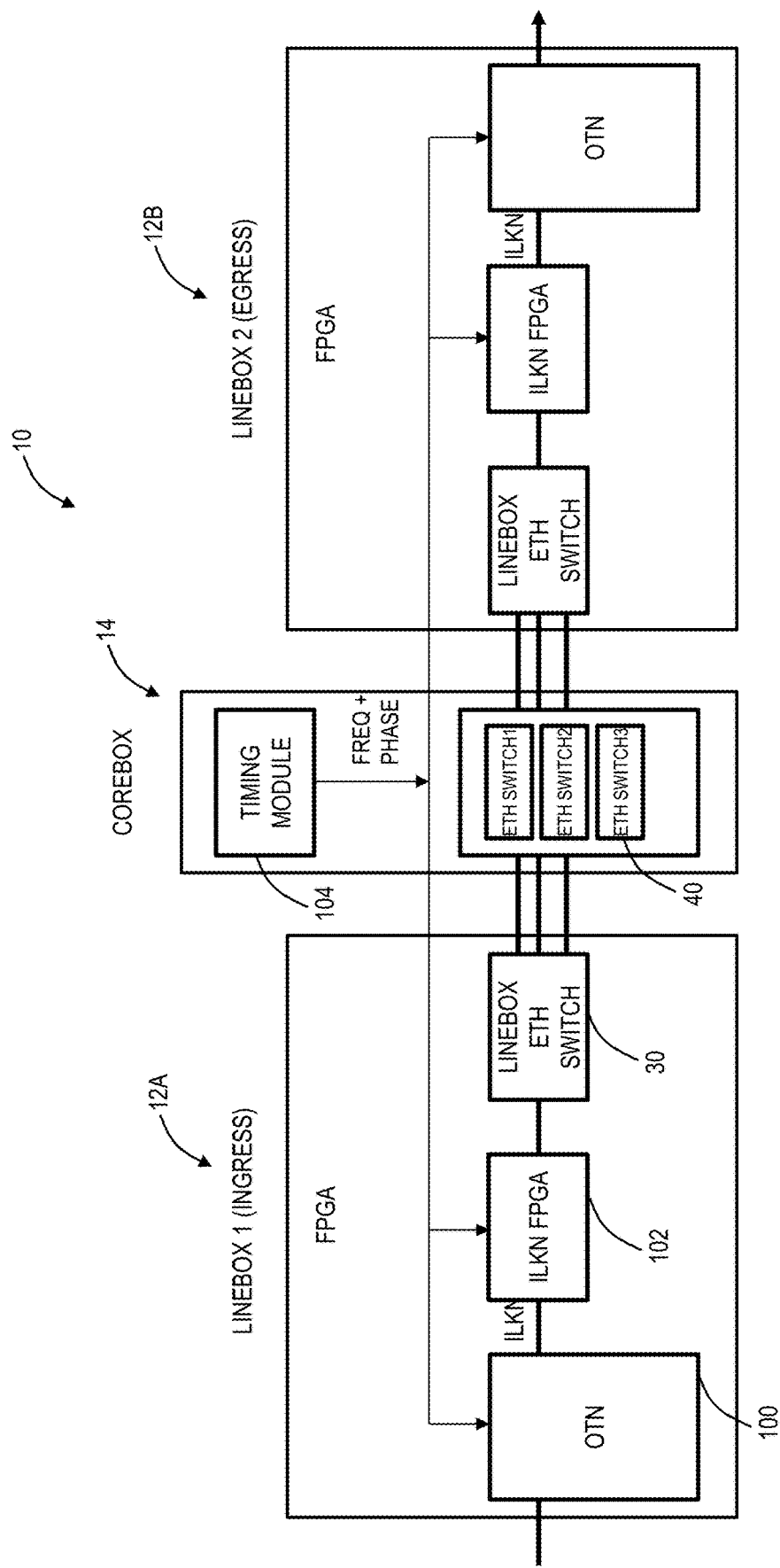
FIG. 20 is a block diagram of modular network element architecture illustrating TDM over an Ethernet fabric.

FIG. 20 is a block diagram of modular network element architecture 10 illustrating TDM over an Ethernet fabric. Specifically, there is an ingress linebox 12A, the corebox 14, and the egress linebox 12B. The lineboxes 12A, 12B include OTN circuitry 100 for OTN framing, Serializing/Deserializing (SERDES), switching, mapping, etc. The OTN circuitry 100 can support up to 50 µs of latency, but the Ethernet switches 30, 40 have far less latency variation. The OTN circuitry 100 connects to an Interlaken (ILKN) FPGA 102 which connects to the Ethernet switch 30. The corebox 14 can include a timing module 104 which is communicatively coupled to the OTN circuitry 100 and the ILKN FPGA 102.

For TDM over Ethernet, the corebox 14 Ethernet switches 40 can turn off switch features such as MLAG, Storm Control, Ingress Access Control Lists (ACLs), port mirroring, etc. in order to bypass pipeline blocks and provide cut-through forwarding. The path selection can be configured to reduce utilization on links that have TDM.

The timing module 104 provides a mechanism for transferring the timing information of Optical Data Unit level k (ODUk)/Optical Data Unit flex (ODUflex) client signals across a packet fabric such that ITU-T Recommendation G.8251 timing specifications are still met without a reduction in the maximum number of network elements allowed by the G.8251 Hypothetical Reference Model. The timing module 104 transfers the timing information of ODUk/ODUflex client signals across a packet fabric that is agnostic to fabric latency and latency variations. The timing module 104 can be used to compensate the packet fabric latency to a configurable value (max fabric latency≤config value≤100 µs) with a resolution of better than 5 ns. ITU-T Recommendation G.8251 "The control of jitter and wander within the optical transport network (OTN)" (09/10) is incorporated herein by reference.

Linebox Self-Expanding System

Figure 21:
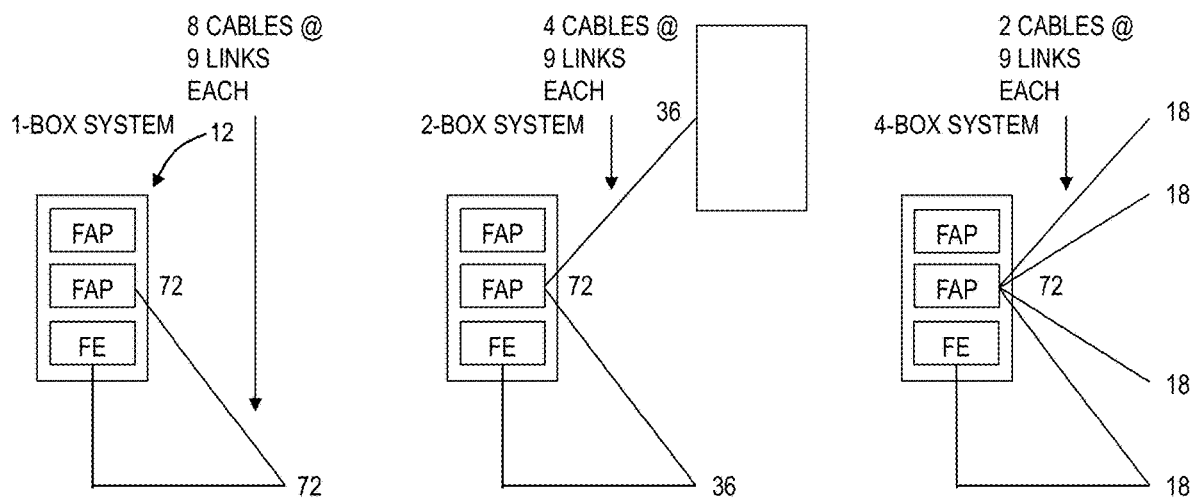
FIG. 21 is a diagram of a single linebox interconnected to other lineboxes and coreboxes in a self-expanding manner.
Figure 21:
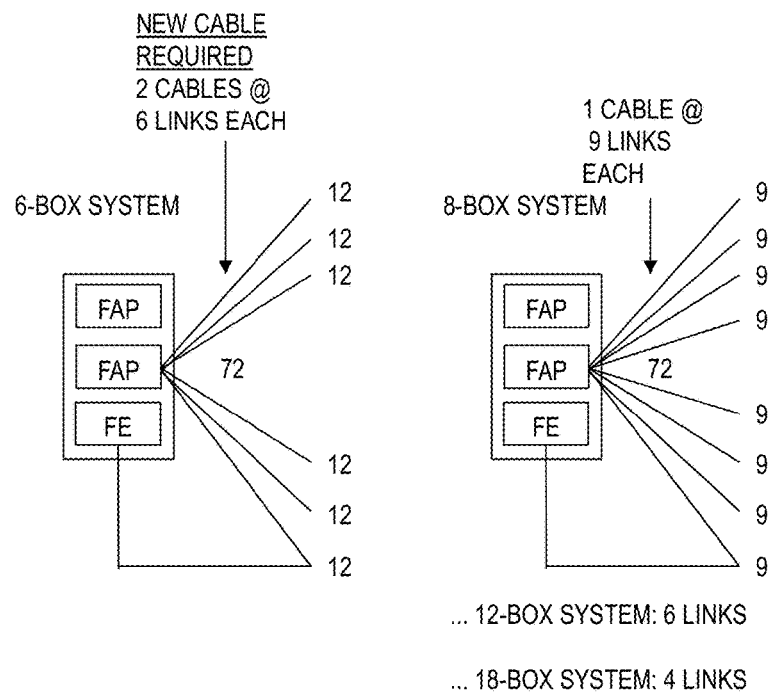

FIG. 21 is a diagram of a single linebox 12 interconnected to other lineboxes 12 and coreboxes 14 in a self-expanding manner. Each linebox 12 can include one or more Fabric Access Processors (FAP) and Fabric Element (FE) (available from Broadcom). The FAP and FE are circuitry for Ethernet switching. The number of FAP-to-FE links changes every time a linebox 12 is added. A subset of cables is simply moved (in-service). If the cable/connector granularity is 3 links, then 1, 2, 4, 6, 8, and 12-Box systems can be supported with one cable.

Linebox Ports

Figure 22:
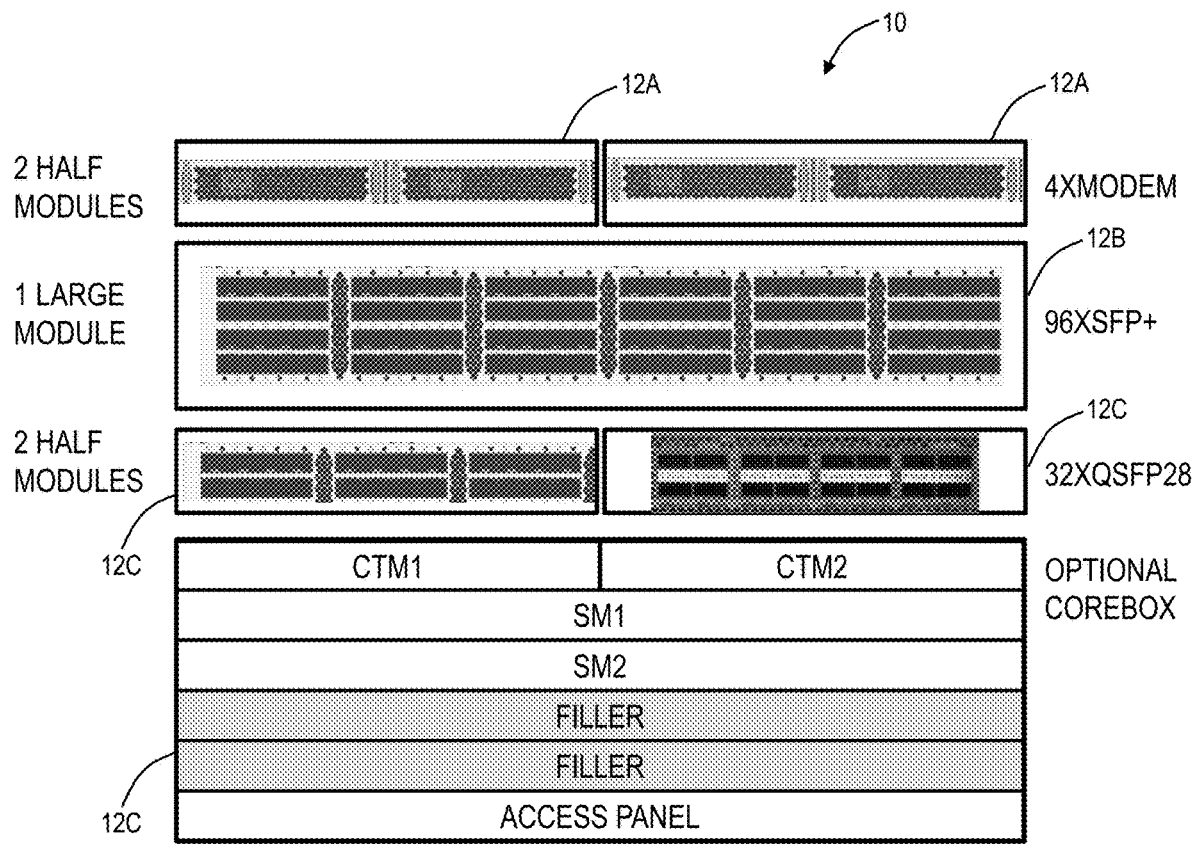
FIG. 22 is a front view of an example modular network element architecture with different lineboxes and ports.

FIG. 22 is a front view of an example modular network element architecture 10 with different lineboxes 12A, 12B, 12C and ports. For example, the linebox 12A is a half-sized module with optical modems, e.g., an optical box supporting high-speed optical transceivers for DWDM transmission. The linebox 12B is a large, double-height module supporting 96× Small Form Factor plus (SPF+) pluggable modules (10 Gb/s). The linebox 12C is a half-sized module supporting 32× Quad Small Form Pluggable 28 (QSFP28) pluggable modules (4×28 Gb/s). The lineboxes 12 can support different oversubscription ratios depending on customer needs, have different ratios of SFP+ versus QSFP28, can configure different ratios of ports with and without Media Access Control Security (MACSec) or OTN, can include x86 fabric-connected half-width servers as per customer needs, etc. The lineboxes 12 can be used with the corebox 14 to provide redundancy, larger switch, timing distribution, etc.

Linebox Self-Expanding Mesh

Figure 23:
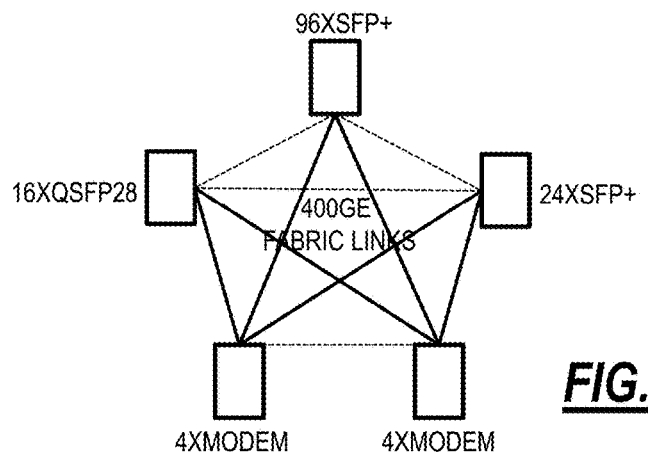
FIG. 23 is a network diagram of the lineboxes in a self-expanding mesh without the corebox.

FIG. 23 is a network diagram of the lineboxes 12 in a self-expanding mesh without the corebox 14. Each linebox 12 contains the Ethernet switch 30 which can perform two functions—fabric connectivity and aggregation of low-speed interfaces (e.g., 10 Gb/s or 100 Gb/s ports) to a 400 GbE fabric. In FIG. 23, the any-to-any switch configuration is shown in dotted lines and the edge aggregation configuration is shown in solid lines. Also, each linebox 12 has a processor 34 which can act as a virtual controller 18 for the entire system.

The modular network element architecture 10 has the flexibility and advantage of expansion with only lineboxes 12 and/or with the corebox 14. As shown in FIG. 21, the linebox 12 can include FAPs and an FE. The corebox 14 can also include multiple FEs. Note, this is similar to the structure used in existing chassis-based systems, e.g., FAPs on line modules and FEs on switch modules.

In FIG. 21, a system can include only lineboxes 12 where the fabric is distributed in each linebox 12 rather than in a centralized corebox 14. This can serve various applications. Again, the linebox 12 includes the processor 34 which can instantiate a virtualized controller module 18 function and can therefore manage the whole chassis. The linebox 12 can communicate with other lineboxes 12 to arbitrate for primary ownership.

The primary linebox 12 is configured to distribute timing synchronization to all the other lineboxes 12, reflect presence information to all lineboxes 12, etc. The primary linebox 12 can accept interrupts and status from all other lineboxes 12. The primary linebox 12 can provide power to a subset of control circuitry in the other lineboxes 12 similar to as described herein with respect to the corebox 14. The primary linebox 12 acts as a central control plane Ethernet switch, a central GPIO reflector, etc.

For example, each linebox 12 can contain 2 FAP devices and 1 FE device. The FAPs are connected to the local FE through a PCB or cabled links in the linebox 12 and meshed to all the other linebox 12 FEs via the cabled backplane. The unused SERDES on each FE can be made available to other lineboxes 12 that contain FAPs allowing the self-expansion.

In a system with a single linebox 12, a loopback cable can connect the FAPs fully to the local FE within the same linebox 12. The backplane cable granularity can support 1, 2, 4, 6, 8, and/or 12 linebox 12 sized systems. Also, the system supports the in-service hitless addition of a new linebox 12 to a self-expanded linebox 12 system. A procedure to move one cable at a time can be enforced by a locking cable assembly controlled by detection of operational fabric links such that a new cable cannot be removed until both ends of the previous cable are correctly seated.

The corebox 14 can also be incorporated in the self-expanded linebox 12 system to increase the range of expansion, add redundancy, or timing distribution. Thus, the modular network element architecture 10 includes the ability to mix self-expanding systems with central fabrics.

The factory configurable fabric connectivity can be optimized for any-to-any switching and for aggregation topology switch. The in-service hitless expansion is enabled by link-up detection controlling a connector locking mechanism. The cable granularity allows multiple expansion ranges with the fewest number of cables.

Slot Numbering

In a conventional chassis, the slot number is well known, i.e., which numbered slot a module is inserted into. With the modular network element architecture 10, the concept of "physical slot number" is replaced with a "virtual slot number," which can be associated to the numbered cable connectors on the corebox 14 midplane 50. Physical and virtual slot numbers are not necessarily mapped 1:1 because a linebox 12 might be 1 U, 2 U, or 4 U and still be considered as a single virtual slot even though it can occupy a range of physical fixed-slot positions in a rack. A technician who needs to replace "linebox virtual slot 3" needs some way of identifying the physical position of that linebox 12 within the rack. This is achieved by a small display on each linebox 12 that displays the virtual slot number.

It is generally suggested that linebox 12 be plugged into cables sequentially which results in monotonic virtual slot number series. However, there are cases where this might not be the case and lineboxes 12 will have out of order virtual slot numbers. In these cases, a solution is proposed so that the technician does not need to search up and down the rack for a particular virtual slot number: a linebox 12 can be given its virtual slot number based on its local altimeter sensor and a continuous calibration involving known-position altimeter sensors, for example, within the corebox 14.

Figure 24:
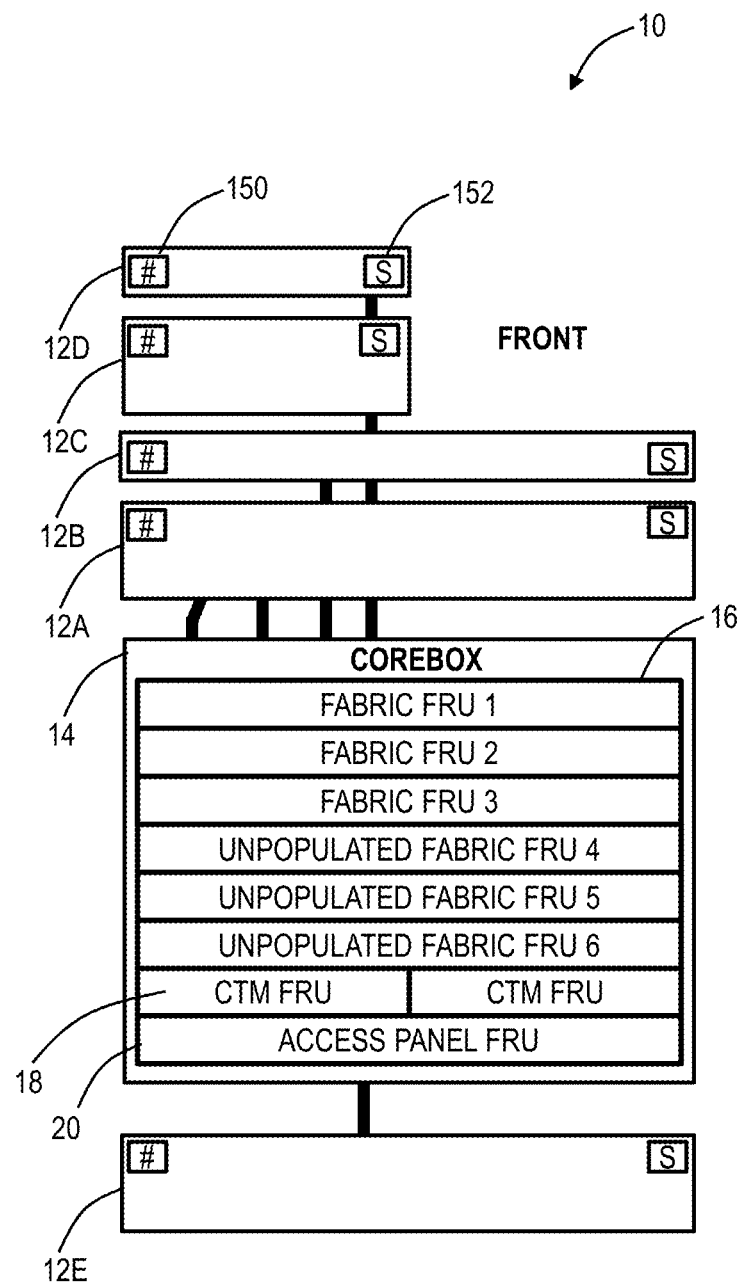
FIG. 24 is a front view of the modular network element architecture illustrating virtual slot numbers and position sensors.

FIG. 24 is a front view of the modular network element architecture 10 illustrating virtual slot numbers 150 and position sensors 152. The virtual slot numbers 150 can be a display which provides a number or other unique identifier. The display is illustrated in the top left portion of the faceplate, but those of ordinary skill recognize a practical implementation can be anywhere. The position sensor 152 is used to automatically identify a location for purposes of assigning the virtual slot numbers 150. In some embodiments, the position sensor 152 can be a physical device, and in other embodiments, the position sensor 152 can be a technique.

In an embodiment, a set of coded active transmitters can be attached to the rack 60 in predetermined positions. The lineboxes 12 and the corebox 14 can lock to the code and measure received power level as well as timestamp the signal from each active transmitter. The lineboxes 12 can communicate their measured power and timestamp data to the corebox 14 or the linebox 12 which uses a relative comparison of all the data to determine the relative position of each linebox 12. The relative position is then communicated to each lineboxes 12 through the data fabric. Determination of relative position between lineboxes 12 is more accurate than the determination of absolute position.

As described herein, the lineboxes 12 are phase and frequency synchronized to the corebox 14 via dedicated point-to-point cabled connection (sub-nanosecond absolute accuracy across lineboxes 12). This allows excellent time stamping of the received 'Ping,' which is something that generic Bluetooth beacons and GPS do not have. Also, the active transmitters can be directional antennas. The active transmitters can be based on Radio Frequency (RF), but some customers might be concerned about RF and an alternative is to use ultrasonic sensors. Reflections can be filtered out by the system due to longer time-of-arrival of reflected paths. With multiple transmitters, a majority vote can help eliminate a problematic path. If the transmitters are located at the rear of the frame, they can be powered more easily. In a preferred embodiment the transmitters are located at the 8 corners of the corebox 14 itself, so no need to mount transmitters on the frame and power them.

In another embodiment, the rail 62 can include small connectors to determine Shelf ID (SID) information from the linebox 12 to location on the rack 60. The electrical connectivity can be via a small USB-C jumper from the side of each linebox 12 into a vertical rail that connects into the corebox 14 with controllers 18. Alternatively, this could be via free-space RF/optical connectivity.

Each linebox slot carrier 70 can have a SID coded via Dual In-line Packaging (DIP) switches (or EPROM) that is configured with a slot number at manufacturing. When a linebox 12 is plugged into the slot carrier 70, it can read the SID. SID values can be sparse so that a new slot carrier 70 can be optionally inserted between two existing carriers and assigned a new SID number without having to change existing slot carriers 70. For example, the spare numbering can be in increments of 5, 10, etc.

In yet another embodiment, there can be some printed pattern on the rail 62 that continuously varies over the full length of the rail 62, e.g., barcode, Quick Response (QR) code, etc. The linebox 12 can scan this pattern using optical or magnetic sensors. The pattern can be a printed label or pre-etched into the metal.

In yet another embodiment, the position sensor 152 can be a Microelectromechanical systems (MEMS) barometer pressure sensor. These can be accurate within +/−5 cm. In the same way that anemometers can allow a weather station to measure barometric pressure in the presence of high winds and gusts, an anemometer can be used to calibrate the pressure sensor in a telecom room, data center, etc. The compact anemometers can be based on measuring the temperature change of a fixed heat output device, e.g., lower temperature means higher airspeed. Pitot Tubes can be used to eliminate some sources of airflow that might affect the pressure measurement. The pressure at 1 m above sea level is 101312.99 Pa. At 1.07 m above sea level, the pressure is 101312.12 Pa, so the difference is 0.87 Pa, which is detectable by the current state of the art.

Upgradeable Backplane and Evolution Across Technologies

The Field-Replaceable Units (FRUs) on the corebox 14 have a connector that does not change. That FRU connector can mate directly to another card in an ortho-direct 'backplaneless' system. The same FRU connector can connect into a standard backplane. The same FRU connector can connect into a midplane that provides receptacles for cable headers thus allowing a cabled backplane. The cables can be electrical or optical.

If the cables are optical, then active circuitry "bump in the wire" can be part of the cable to handle the Electrical-Optical (EO)-Optical-Electrical (OE) conversion. In order to support this, power and ground outputs are provided on the connector to power the bump-in-a-wire. This is not normally done on existing backplanes. An alternative to locating the EO-OE conversion as part of a bump-in-a-wire cable, the EO-OE can be performed at a powered "patch" panel.

All together this enables an FRU or linebox 12 to work in different types of chassis: ortho-direct, backplane, midplane, cabled electrical backplane, and the optical cabled backplane. Therefore, the linebox 12 system can work into all of these and evolve from one to another even in the field. With cabled backplanes (electrical Twinax or optical), hitless backplane field upgradeability is supported.

To maintain compatibility and upgradeability, signals are routed from connector A column to connector B column; no crossovers between columns. The row-to-row routing uses "Long-to-short" to optimize pair-to-pair skew. The corebox 14 provides output power on the backplane connector to power backplane bump-in-a-wire. The granularity of cable bundles enables only a subset of the links that need to be unplugged at one time. Power and ground outputs provided on the connector with appropriate management of return currents for low Electromagnetic Interference (EMI).

Variable Bandwidth Slots

As described herein, the modular network element architecture 10 provides flexibility in the expansion. There are two types system sizing, namely configurable size at the factory and configurable size at the customer premise. For example, in many cases, customers will simply order 'small', 'medium', or 'large' systems that have enough spare cables for them to add new lineboxes 12 as desired. In addition to the number of cables, the cable granularity is also important because it allows some lineboxes 12 to get more bandwidth than others. For example, a Jericho-based linebox 12 (Jericho is a switching Application Specific Integrated Circuit (ASIC) available from Broadcom) could use 36 links and a Jericho2-based linebox 12 could use 72 links even though both boxes are 1 U physical size. If the cable bundle granularity is 12-links per bundle, then both of these lineboxes 12 can be accommodated in a single system. The same cable granularity can be used for scale by allocating fabric bandwidth efficiently.

A system could support 3 Jericho2 lineboxes 12, 6 Jericho lineboxes 12, or 12 Arad lineboxes 12 (Arad is a switching ASIC available from Broadcom). None of this is possible in existing systems, e.g., a 10-slot chassis system will support up to 10 of a given card regardless of whether that card has Arad, Jericho, or Jericho2. Cable granularity is further determined by the number of fabrics present. If there are 3 fabrics, then there might be 12 cables going to each fabric for a total of 36 links per virtual slot. A Jericho2 linebox 12 might use two virtual slots worth of cables for a total of 72 cables. All of this can be determined at manufacturing to create flexibility not possible in existing backplane systems.

Multi-Shelf Expansion

It is possible to expand a system by adding corebox 14 fabrics and having direct connections between them. In the chassis-based approach, this is known as "multi-shelf" and involves creating a multi-stage fabric. This is possible with the modular network element architecture 10. However, with the modular network element architecture 10 there is a unique possibility to add a corebox 14 to a system that already has a corebox 14 and maintain a single stage fabric. Essentially, the second corebox 14 doubles the number of fabrics. So, if a corebox 14 had 3 Fabric Elements, then two coreboxes 14 have a total of 6 FE's and the system size can double. The challenge is how to re-distribute the cabled links from the existing lineboxes 12 that are only connected to the first corebox 14. So, if 12 links were going to each FE within a corebox 14, then 6 of those 12 links per FE would need to be moved to the second corebox 14. Part of the design is to choose these cable granularities at cable manufacturing that allow the desired level of expansion on customer premises. However, it is also a way of building different sized systems at manufacturing. Existing approaches can require the design of new backplanes, power supplies, fabric cards, in order to produce systems of different sizes. Whereas the modular network element architecture 10 can achieve this expansion through cabling. In 'multi-shelf' expansion, the key point is that links are dual-use—they can connect corebox 14 to linebox 12 or corebox 14 to corebox 14. This is not done in existing systems.

Hitless Upgrade

Consider a system with 3 fabrics with 12 cable links going from a linebox 12 to each fabric on the corebox 14. If the fabrics are protected 2+1, then 2 fabrics are sufficient to pass full rate. So, each 12-link cable bundle can be replaced one bundle at a time while the other two cabled bundles carry all the traffic with their 24 links. Some deployments might not have a 2+1 redundancy ratio; they might want a 30+6 link redundancy ratio. In that case, a cable bundle granularity of 6 links might be more conducive to hitless upgrade. This kind of granular backplane upgrade is not possible in existing systems.

For the cabled case, a switch can be included on the cable latch that sends a signal to the software that is used to take traffic off that cable so that no in-flight fabric data is lost when the cable is pulled. This signal can be sent to both ends of the cable bundle so that TX and RX data can both be taken off pre-emptively.

Linebox

Figure 25:
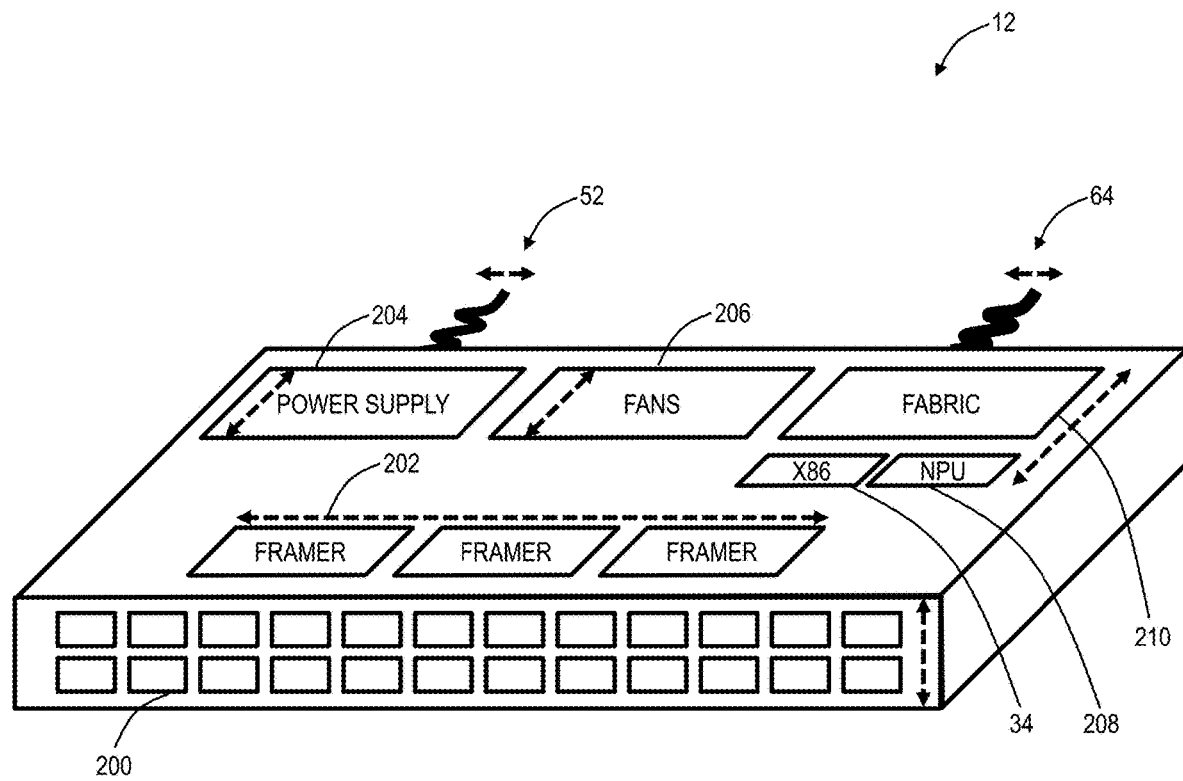
FIG. 25 is a block diagram of an example implementation of a linebox.

FIG. 25 is a block diagram of an example implementation of a linebox 12. As described herein, the linebox 12 is an all-in-one design that provides flexibility, an optimal faceplate area and board volume, optimal framing as needed, an optimal architecture, power, and interconnect. In this example, the linebox 12 is 1 U high and has 24 faceplate ports 200. The faceplate ports 200 can connect to framing circuitry 202 which can provide OTN, no framing, MACSec, coherent Digital Signal Processing (DSP), Forward Error Correction (FEC), etc. The linebox 12 can include a power supply 204 as needed for the application (100 W, 400 W, 1200 W, etc.) and fans 206 for cooling. The linebox 12 can also include the processor 34, a Network Processing Unit (NPU) 208, and fabric circuitry 210. The fabric circuitry 210 can include various FAPs, FEs, etc. as needed for the application.

The linebox 12 approach can include some of the following options. For optics, the linebox 12 can include, for example, 1 Gb/s SFP ports, 10 Gb/s SFP ports, 100 Gb/s CFP (100 G Form-factor Pluggable), 100 Gb/s CFP2, 100 Gb/s CFP4, 100 Gb/s QSFP28 ports, Coherent pluggables, CFP2 Analog Coherent Optics (ACO), etc. The fabric circuitry 210 can include various different implementations such as, for example, Petra-B 100 G, Arad 200 G, Jericho 700 G, Qumran 800 G, Jericho+800 G, Jericho2 2400 G, Xpliant, Intel FM (Fulcrum), etc. The framing circuitry 202 can include none, OTN, MACSec, etc. The modular network element architecture 10 can have various sizes, power/slot, fabric density, numbers of fabrics, and different backplane connectivity (e.g., Twinax, PCB, and/or active optical cables).

Corebox/Twinax Cabling

Figure 26:
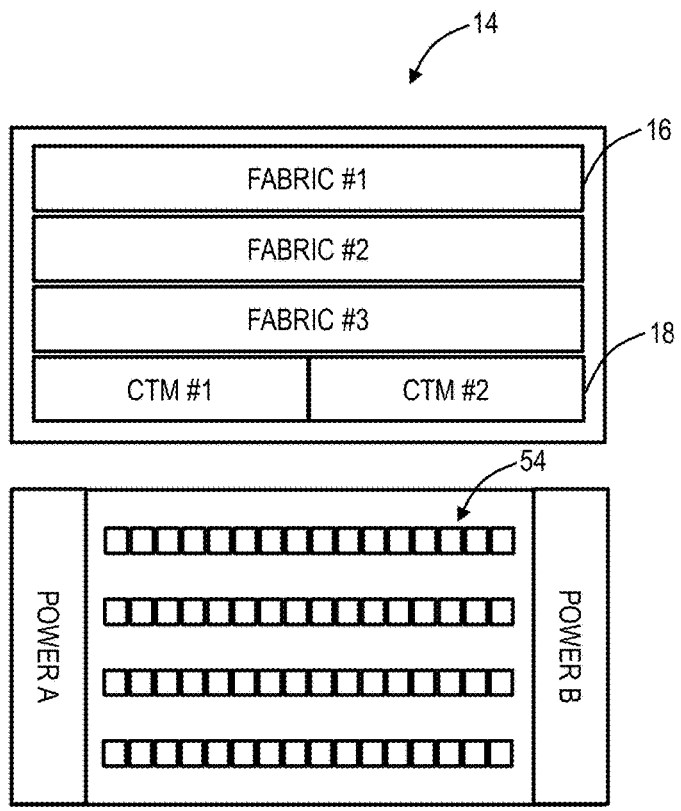
FIG. 26 is a block diagram of a front view and a rear view of another implementation of the corebox.
Figure 27:
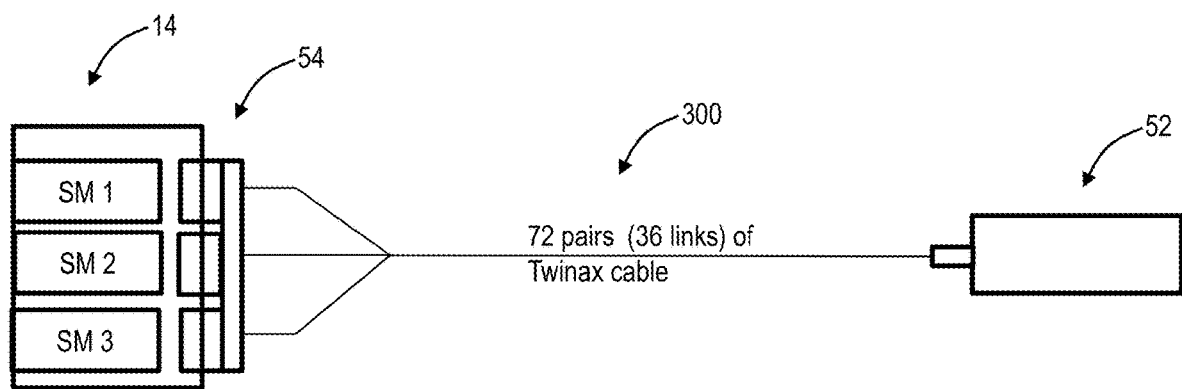
FIG. 27 is a diagram of a Twinax cable and connector.

FIG. 26 is a block diagram of a front view and a rear view of another implementation of the corebox 14. FIG. 27 is a diagram of a Twinax cable 300 and connector 52. The corebox 14 in FIG. 26 includes three switch modules 16 and two controller modules 18. The rear view of the corebox 14 illustrates the Twinax connector field 54 which supports 16 cables per module 16. Here, the corebox 14 supports 1 or 2 cables from the Twinax connector field 54 to each linebox 12. Each cable can have 12 links from each switch module 16 and control links from the controller modules 18. The Twinax cable 300 can include 72 pairs (36 links) and this example corebox 14 can support up to 16 cables. The Twinax connector field 54 is configured to split the 72 pairs (36 links) into 24 pairs (12 links) to each switch module 18.

Process of Deploying a Modular Network Element

Figure 28:
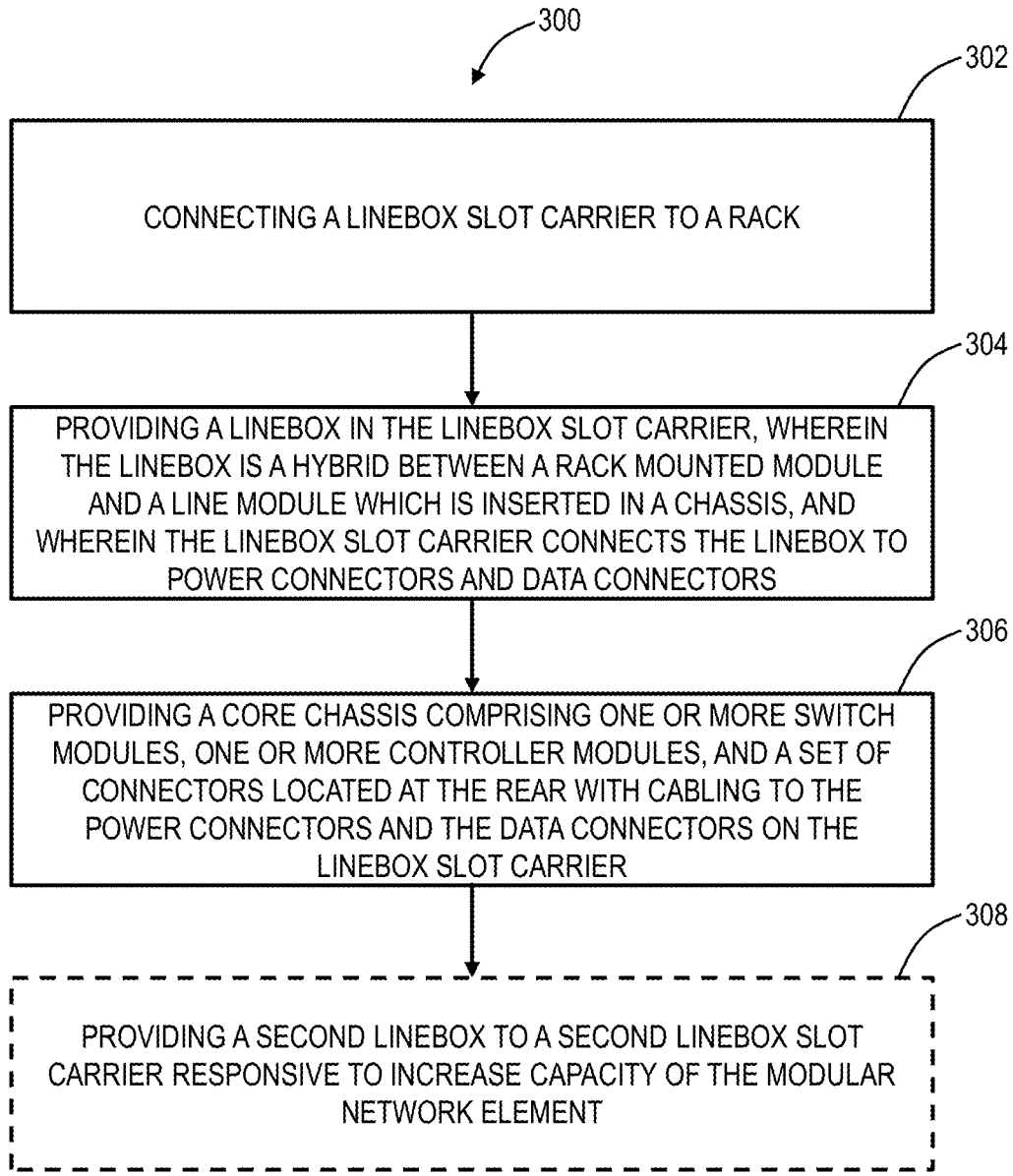
FIG. 28 is a flowchart of a process of deploying a modular network element.

FIG. 28 is a flowchart of a process 300 of deploying a modular network element. The process 300 includes connecting a linebox slot carrier to a rack (step 302); providing a linebox in the linebox slot carrier, wherein the linebox is a hybrid between a rack mounted module and a line module which is inserted in a chassis, and wherein the linebox slot carrier connects the linebox to power connectors and data connectors (step 304); and providing a core chassis (corebox 14) including one or more switch modules, one or more controller modules, and a set of connectors located at the rear with cabling to the power connectors and the data connectors on the linebox slot carrier (step 306). The process 300 can further include providing a second linebox to a second linebox slot carrier responsive to increase capacity of the modular network element (step 308). The second linebox can be added to the core chassis in-service.

In another embodiment, a modular network element includes one or more lineboxes 12 which are a hybrid between a rack mounted module and a line module which is inserted in a chassis; one or more linebox carriers 70 which are rack mountable and configured to selectively receive the one or more lineboxes 12 and provide power connectors 52 and data connectors 64 thereto; and a core chassis (corebox 14) including one or more switch modules 16, one or more controller modules 18, and a set of connectors 54 located at the rear for cabling to the power connectors 52 and the data connectors 64 on the one or more linebox carriers 70. The one or more lineboxes 12 can include a plurality of faceplate ports 200 connected to fabric circuitry 210 communicatively coupled to the one or more switch modules 16 via the cabling; and the one or more switch modules 16 are connected to one another and the one or more controller modules 18 via a midplane 50 or cables.

The cabling can include one of electrical cabling with a plurality of pairs of Twinaxial cable and optical cabling. Each cable between a linebox 12 and the core chassis can include a plurality of bundles each having a plurality of links and a number of the plurality of bundles is based on a number of the one or more switch modules 16. A chassis management protocol is implemented between the one or more lineboxes 12 and the core chassis, and wherein the one or more lineboxes 12 and the core chassis are managed as a single entity. The chassis management protocol implements, between the one or more lineboxes 12 and the core chassis, timing synchronization, presence, status, ownership, interrupts, reset, power, and position identification. The one or more controller modules 18 provide power and connectivity to a Field Programmable Gate Array (FPGA) or other circuitry on each linebox for establishing the chassis management protocol to power the linebox on and off.

The core chassis can include an access panel 20 that supports the core chassis and each of the one or more lineboxes 12. Each of the one or more lineboxes 12 includes a display 150 which provides a virtual slot number based on a relative position in a rack. The one or more lineboxes 12 can include a plurality of lineboxes 12 with at least two lineboxes 12 having a different pitch. The one or more lineboxes 12 can include a plurality of lineboxes 12 with at least two lineboxes 12 having one or more of a different number of faceplate ports 200 and a different type of pluggable optics. The one or more lineboxes 12 each include an Ethernet switch 30 which connect to another Ethernet switch 40 in the one or more switch modules 16. The one or more linebox carriers 70 can include retractable pins 72 with a spring-loaded mechanism that grabs into holes in rails 62 on a rack 60 and which has a push to disengage mechanism enabling front-only access to the rack. The one or more linebox carriers 70 have slack in the cabling to the core chassis allowing movement up and down the rack 60.

In another embodiment, a modular network element includes one or more lineboxes 12 which are a hybrid between a rack mounted module and a line module which is inserted in a chassis, each of the one or more lineboxes 12 includes a plurality of faceplate ports 200 connected to fabric circuitry 210 and a processor 34; and one or more linebox carriers 70 which are rack mountable and configured to selectively receive the one or more lineboxes 12 and provide power connectors 52 and data connectors 64 thereto. The one or more lineboxes 12 can include a plurality of lineboxes 12 collectively forming a mesh therebetween via the data connectors 64, and wherein one of the plurality of lineboxes is designated as a primary linebox for implementing a virtual controller of the modular network element via the processor 34. A core chassis (corebox 14) can be added in-service to increase capacity of the modular network element, wherein the core chassis include one or more switch modules, one or more controller modules, and a set of connectors located at the rear for cabling to the power connectors and the data connectors on the one or more linebox carriers.

Process for Ethernet Path Selection

Figure 29:
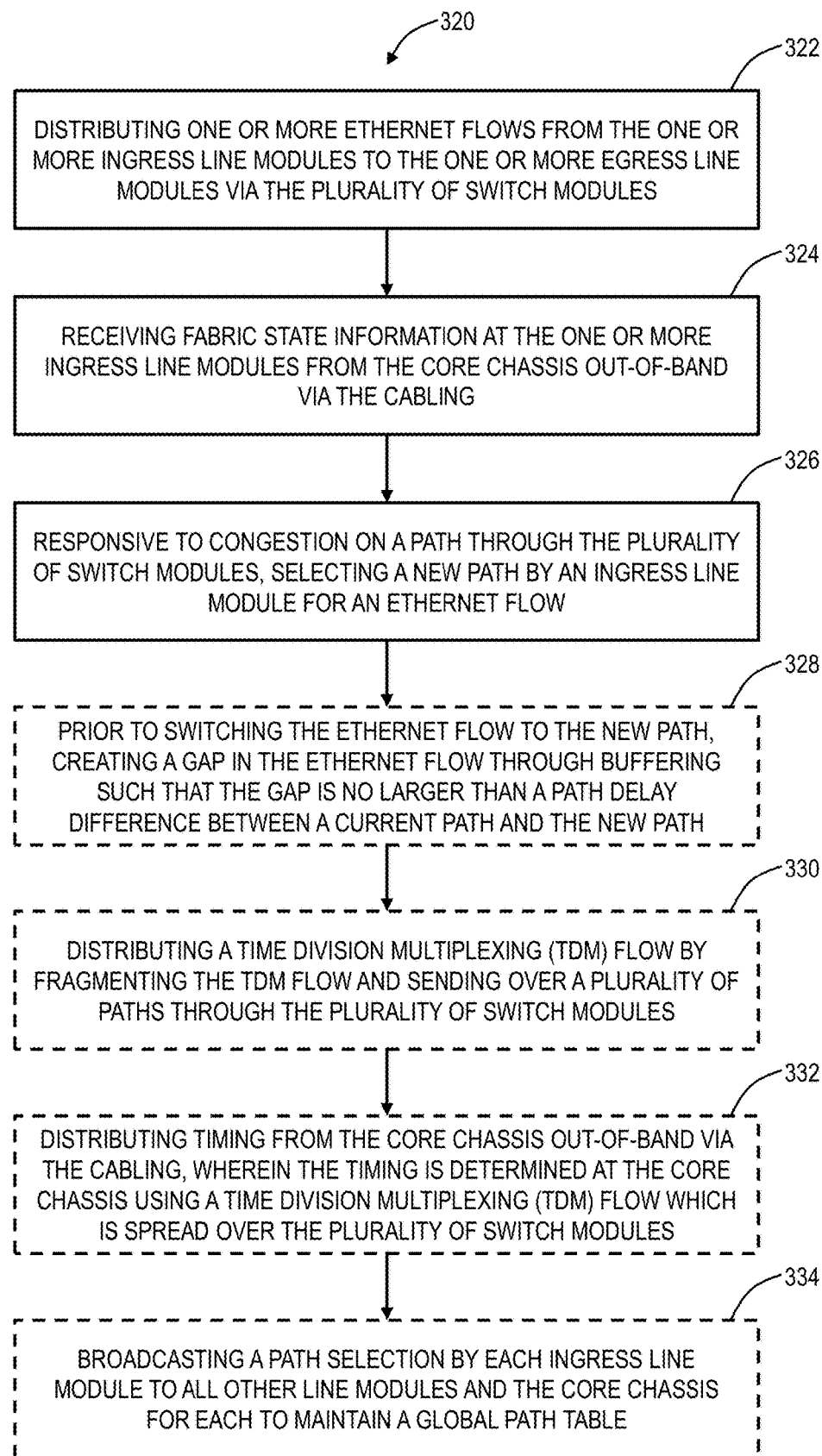
FIG. 29 is a flowchart of a process of Ethernet path selection in a modular network element.

FIG. 29 is a flowchart of process 320 of Ethernet path selection in a modular network element. The process 320 is implemented in a modular network element including one or more ingress line modules, a plurality of switch modules in a chassis, and one or more egress line modules, wherein the one or more ingress line modules and the one or more egress line modules are located separate the chassis and connected to the chassis via cabling. Of note, the line modules can be the linebox 12 and the chassis can be the corebox 14, although other embodiments are also contemplated. The process 320 includes distributing one or more Ethernet flows from the one or more ingress line modules to the one or more egress line modules via the plurality of switch modules (step 322); receiving fabric state information at the one or more ingress line modules from the chassis out-of-band via the cabling (step 324); and, responsive to congestion on a path through the plurality of switch modules, selecting a new path by an ingress line module for an Ethernet flow (step 326).

The process 320 can further include, prior to switching the Ethernet flow to the new path, creating a gap in the Ethernet flow through buffering such that the gap is no larger than a path delay difference between a current path and the new path (step 328). A size of the gap can be set to a latency of the current path minus a latency of the new path plus a margin. The process 320 can further include distributing a Time Division Multiplexing (TDM) flow by fragmenting the TDM flow and sending over a plurality of paths through the plurality of switch modules (step 330).

The process 320 can further include distributing timing from the core chassis out-of-band via the cabling, wherein the timing is determined at the core chassis using a Time Division Multiplexing (TDM) flow which is spread over the plurality of switch modules (step 332). The core chassis can utilize a TDM packet header to estimate relative path latency differences. The process 320 can further include broadcasting a path selection by each ingress line module to all other line modules and the core chassis for each to maintain a global path table (step 334). The Ethernet flow can include an elephant flow and each flowburst of the elephant flow is eligible to take a different path if its interburst gap is larger than a difference in latency between a current path and the new path.

In another embodiment, a modular network element configured for Ethernet path selection includes one or more ingress line modules (lineboxes 12); one or more switch modules 16 in a chassis (corebox 14); and one or more egress line modules (lineboxes 12), wherein the one or more ingress line modules and the one or more egress line modules are located separate from the chassis and connected to the chassis via cabling, wherein one or more Ethernet flows are distributed from the one or more ingress line modules to the one or more egress line modules via the plurality of switch modules, wherein the one or more ingress line modules receive fabric state information from the core chassis out-of-band via the cabling, and wherein, responsive to congestion on a path through the plurality of switch modules, a new path is selected by an ingress line module for an Ethernet flow.

Prior to switching the Ethernet flow to the new path, a gap can be created in the Ethernet flow through buffering such that the gap is no larger than a path delay difference between a current path and the new path. A size of the gap can be set to a latency of the current path minus a latency of the new path plus a margin. A Time Division Multiplexing (TDM) flow can be fragmented and sent over a plurality of paths through the plurality of switch modules. Timing can be distributed from the core chassis out-of-band via the cabling, wherein the timing is determined at the core chassis using a Time Division Multiplexing (TDM) flow which is spread over the plurality of switch modules. The core chassis can utilize a TDM packet header to estimate relative path latency differences. A path selection can be broadcast by each ingress line module to all other line modules and the core chassis for each to maintain a global path table. The Ethernet flow can include an elephant flow and each flowburst of the elephant flow is eligible to take a different path if its interburst gap is larger than a difference in latency between a current path and the new path.

In a further embodiment, a core chassis (corebox 14) in a modular network element configured for Ethernet path selection includes one or more switch modules 16; one or more controllers 18; a midplane 50 for communication between the one or more switch modules and the one or more controllers; and cabling for communication to one or more ingress line modules and one or more egress line modules, wherein the one or more ingress line modules and the one or more egress line modules are located separate from the chassis and connected to the chassis via the cabling, wherein one or more Ethernet flows are distributed from the one or more ingress line modules to the one or more egress line modules via the plurality of switch modules, wherein the one or more ingress line modules receive fabric state information from the one or more controllers out-of-band via the cabling, and wherein, responsive to congestion on a path through the plurality of switch modules, a new path is selected by an ingress line module for an Ethernet flow.

A Time Division Multiplexing (TDM) flow can be fragmented and sent over a plurality of paths through the plurality of switch modules. Timing can be distributed from the core chassis out-of-band via the cabling, wherein the timing is determined at the core chassis using a Time Division Multiplexing (TDM) flow which is spread over the plurality of switch modules. The core chassis can utilize a TDM packet header to estimate relative path latency differences.

Process for Managing a Modular Network Element

Figure 30:
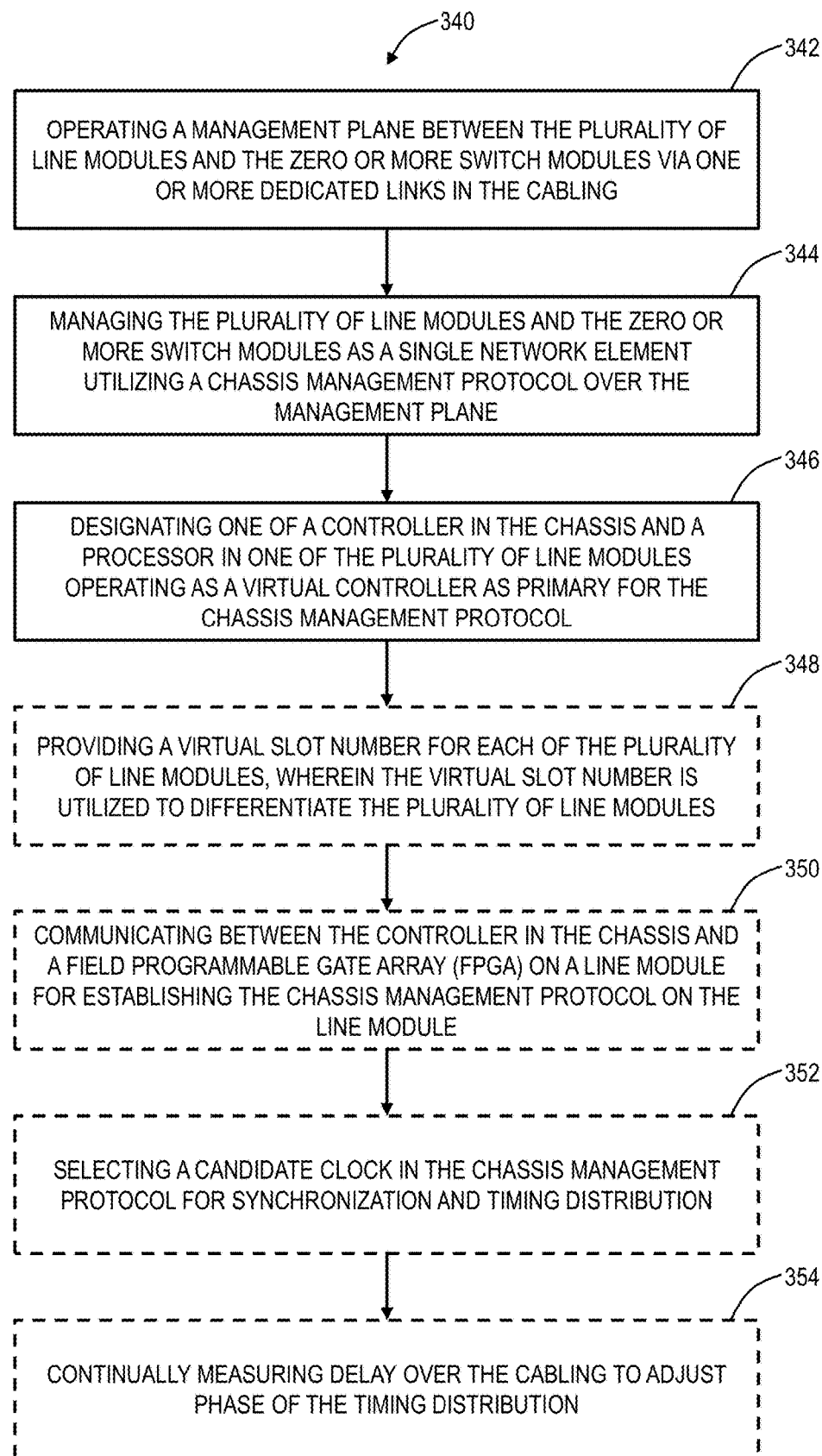
FIG. 30 is a flowchart of a process of managing a modular network element.

FIG. 30 is a flowchart of a process 340 of managing a modular network element. The process 340 operates in the modular network element which includes a plurality of line modules and zero or more switch modules in a chassis, wherein the plurality of line modules are located separate from the chassis and connected to the chassis and/or to one another via cabling. The process 340 includes operating a management plane between the plurality of line modules and the zero or more switch modules via one or more dedicated links in the cabling (step 342); managing the plurality of line modules and the zero or more switch modules as a single network element utilizing a chassis management protocol over the management plane (step 344); and designating one of a controller in the chassis and a processor in one of the plurality of line modules operating as a virtual controller as primary for the chassis management protocol (step 346).

The process 340 can further include providing a virtual slot number for each of the plurality of line modules, wherein the virtual slot number is utilized to differentiate the plurality of line modules (step 348). The virtual slot number can be automatically assigned based on a position sensor on each of the plurality of line modules or through the chassis detecting a position of each of the plurality of line modules.

The management plane can operate over Universal Serial Bus (USB) pins and a 10 Gigabit Ethernet alternate mode which uses a subset of the USB pins. The USB can be used to bridge a plurality of protocols in the management plane and to determine module presence, and wherein the 10 Gigabit Ethernet is utilized for Precision Time Protocol. The USB can be used for power, presence, primary arbitration, bidirectional status, health monitoring, configuration, initialization of data path, software download, interrupts, reset, LED control, I2C bridge, Universal Asynchronous Receiver-Transmitter (UART) bridge, SPI bridge, Pulse Width Modulation (PWM) bridge, General-Purpose Input/Output (GPIO) bridge, and PCIe bridge.

The process 340 can further include communicating between the controller in the chassis and a Field Programmable Gate Array (FPGA) or circuitry on a line module for establishing the chassis management protocol on the line module (step 350). The process 340 can further include selecting a candidate clock in the chassis management protocol for synchronization and timing distribution (step 352). The process 340 can further include continually measuring delay over the cabling to adjust phase of the timing distribution (step 354). The management plane can be operated over the cabling out-of-band from a data plane.

In another embodiment, a modular network element managed as a single entity includes a plurality of line modules (lineboxes 12); and zero or more switch modules 16 in a chassis (corebox 14 which is optional), wherein the plurality of line modules are located separate from the chassis and from one another, and connected to the chassis and/or to one another via cabling, wherein a management plane is operated between the plurality of line modules and the zero or more switch modules via one or more dedicated links in the cabling, wherein the plurality of line modules and the zero or more switch modules are managed as a single network element utilizing a chassis management protocol over the management plane, and one of a controller 18 in the chassis and a processor 34 in one of the plurality of line modules operating as a virtual controller is designated as primary for the chassis management protocol.

A virtual slot number can be provided for each of the plurality of line modules, wherein the virtual slot number is utilized to differentiate the plurality of line modules. The virtual slot number can be automatically assigned based on a position sensor on each of the plurality of line modules or through the chassis detecting a position of each of the plurality of line modules. The management plane can operate over Universal Serial Bus (USB) pins and a 10 Gigabit Ethernet alternate mode which uses a subset of the USB pins. The USB can be used to bridge a plurality of protocols in the management plane and to determine module presence, and wherein the 10 Gigabit Ethernet is utilized for Precision Time Protocol.

The controller in the chassis can communicate with a Field Programmable Gate Array (FPGA) or circuitry on a line module for establishing the chassis management protocol on the line module. A candidate clock can be selected in the chassis management protocol for synchronization and timing distribution. The delay can be continually measured over the cabling to adjust phase of the timing distribution. The management plane can be operated over the cabling out-of-band from a data plane.

In a further embodiment, an apparatus configured to manage a modular network element includes a processor and memory storing instructions that, when executed, cause the processor to operate a management plane between the plurality of line modules and the zero or more switch modules via one or more dedicated links in cabling between the plurality of line modules and the zero or more switch modules; and manage the plurality of line modules and the zero or more switch modules as a single network element utilizing a chassis management protocol over the management plane, wherein the apparatus is designated as a primary in the chassis management protocol, and the apparatus is physically separate from at least one of the plurality of line modules and the zero or more switches.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A modular network element configured for Ethernet path selection, the modular network element comprising:
   one or more ingress line modules;
   one or more switch modules in a chassis; and
   one or more egress line modules, wherein the one or more ingress line modules and the one or more egress line modules are located separate from the chassis and connected to the chassis via cabling,
   wherein one or more Ethernet flows are distributed from the one or more ingress line modules to the one or more egress line modules via the plurality of switch modules,
   wherein the one or more ingress line modules receive fabric state information from the chassis out-of-band via the cabling,
   wherein, responsive to congestion on a path through the plurality of switch modules, a new path is selected by an ingress line module for an Ethernet flow,
   wherein, prior to switching the Ethernet flow to the new path, a gap is created in the Ethernet flow through buffering such that the gap is no larger than a path delay difference between a current path and the new path, and wherein a size of the gap is set to a latency of the current path minus a latency of the new path plus a margin.

2. The modular network element of claim 1, wherein a Time Division Multiplexing (TDM) flow is fragmented and sent over a plurality of paths through the plurality of switch modules.

3. The modular network element of claim 1, wherein timing is distributed from the chassis out-of-band via the cabling, wherein the timing is determined at the chassis using a Time Division Multiplexing (TDM) flow which is spread over the plurality of switch modules.

4. The modular network element of claim 3, wherein the chassis utilizes a TDM packet header to estimate relative path latency differences.

5. The modular network element of claim 1, wherein a path selection is broadcast by each ingress line module to all other line modules and the chassis for each to maintain a global path table.

6. The modular network element of claim 1, wherein the Ethernet flow comprises an elephant flow and each flowburst of the elephant flow is eligible to take a different path if its interburst gap is larger than a difference in latency between a current path and the new path.

7. A modular network element configured for Ethernet path selection, the modular network element comprising:
   one or more ingress line modules;
   one or more switch modules in a chassis; and
   one or more egress line modules, wherein the one or more ingress line modules and the one or more egress line modules are located separate from the chassis and connected to the chassis via cabling,
   wherein one or more Ethernet flows are distributed from the one or more ingress line modules to the one or more egress line modules via the plurality of switch modules,
   wherein the one or more ingress line modules receive fabric state information from the chassis out-of-band via the cabling,
   wherein, responsive to congestion on a path through the plurality of switch modules, a new path is selected by an ingress line module for an Ethernet flow, and
   wherein timing is distributed from the chassis out-of-band via the cabling, wherein the timing is determined at the chassis using a Time Division Multiplexing (TDM) flow which is spread over the plurality of switch modules, and wherein the chassis utilizes a TDM packet header to estimate relative path latency differences.

8. The modular network element of claim 7, wherein, prior to switching the Ethernet flow to the new path, a gap is created in the Ethernet flow through buffering such that the gap is no larger than a path delay difference between a current path and the new path.

9. The modular network element of claim 8, wherein a size of the gap is set to a latency of the current path minus a latency of the new path plus a margin.

10. The modular network element of claim 7, wherein a Time Division Multiplexing (TDM) flow is fragmented and sent over a plurality of paths through the plurality of switch modules.

11. The modular network element of claim 7, wherein a path selection is broadcast by each ingress line module to all other line modules and the chassis for each to maintain a global path table.

12. The modular network element of claim 7, wherein the Ethernet flow comprises an elephant flow and each flowburst of the elephant flow is eligible to take a different path if its interburst gap is larger than a difference in latency between a current path and the new path.

13. A modular network element configured for Ethernet path selection, the modular network element comprising:
  one or more ingress line modules;
  one or more switch modules in a chassis; and
  one or more egress line modules, wherein the one or more ingress line modules and the one or more egress line modules are located separate from the chassis and connected to the chassis via cabling,
  wherein one or more Ethernet flows are distributed from the one or more ingress line modules to the one or more egress line modules via the plurality of switch modules,
  wherein the one or more ingress line modules receive fabric state information from the chassis out-of-band via the cabling,
  wherein, responsive to congestion on a path through the plurality of switch modules, a new path is selected by an ingress line module for an Ethernet flow, and
  wherein the Ethernet flow comprises an elephant flow and each flowburst of the elephant flow is eligible to take a different path if its interburst gap is larger than a difference in latency between a current path and the new path.

14. The modular network element of claim 13, wherein, prior to switching the Ethernet flow to the new path, a gap is created in the Ethernet flow through buffering such that the gap is no larger than a path delay difference between a current path and the new path.

15. The modular network element of claim 14, wherein a size of the gap is set to a latency of the current path minus a latency of the new path plus a margin.

16. The modular network element of claim 13, wherein a Time Division Multiplexing (TDM) flow is fragmented and sent over a plurality of paths through the plurality of switch modules.

17. The modular network element of claim 13, wherein timing is distributed from the chassis out-of-band via the cabling, wherein the timing is determined at the chassis using a Time Division Multiplexing (TDM) flow which is spread over the plurality of switch modules.

18. The modular network element of claim 17, wherein the chassis utilizes a TDM packet header to estimate relative path latency differences.

19. The modular network element of claim 13, wherein a path selection is broadcast by each ingress line module to all other line modules and the chassis for each to maintain a global path table.

* * * * *

UNITED STATES PATENT AND TRADEMARK OFFICE
CERTIFICATE OF CORRECTION

| | | |
|---|---|---|
| PATENT NO. | : 10,674,241 B2 | Page 1 of 1 |
| APPLICATION NO. | : 15/959820 | |
| DATED | : June 2, 2020 | |
| INVENTOR(S) | : Daniel Rivaud, Ian Duncan and James Tierney | |

It is certified that error appears in the above-identified patent and that said Letters Patent is hereby corrected as shown below:

On the Title Page

The inventorship at (72) should appear as follows:
(72) Daniel Rivaud (Ottawa, CA); Ian Duncan (Ottawa, CA); James Tierney (Carp, CA)

Signed and Sealed this
Twenty-fourth Day of November, 2020

Andrei Iancu
*Director of the United States Patent and Trademark Office*